(12) United States Patent
McLoughlin et al.

(10) Patent No.: US 10,996,770 B2
(45) Date of Patent: May 4, 2021

(54) MULTI-MODE SCROLL WHEEL FOR INPUT DEVICE

(71) Applicant: Logitech Europe S.A., Lausanne (CH)

(72) Inventors: Padraig McLoughlin, Rathcormac (IE);
Arnaud Perret-Gentil, Newark, CA (US); Nuno Miguel Pereira dos Anjos Valverde, Bandon (IE); Jan Stoeckli, Jongny (CH); Lars Lauridsen, Lausanne (CH); Jean-Claude Dunant, Fey (CH)

( * ) Notice: Subject to any disclaimer, the term of this patent is extended or adjusted under 35 U.S.C. 154(b) by 0 days.

(21) Appl. No.: 16/153,387

(22) Filed: Oct. 5, 2018

(65) Prior Publication Data

US 2020/0004352 A1 Jan. 2, 2020

Related U.S. Application Data

(60) Provisional application No. 62/690,591, filed on Jun. 27, 2018.

(51) Int. Cl.
*G06F 3/0354* (2013.01)
*G06F 3/038* (2013.01)

(52) U.S. Cl.
CPC .......... *G06F 3/03543* (2013.01); *G06F 3/038* (2013.01)

(58) Field of Classification Search
None
See application file for complete search history.

(56) References Cited

U.S. PATENT DOCUMENTS

| | | | |
|---|---|---|---|
| 9,778,760 B1 | 10/2017 | Huang et al. | |
| 2010/0288072 A1* | 11/2010 | Springer | B62D 1/04 |
| | | | 74/552 |
| 2012/0062398 A1* | 3/2012 | Durand | G06F 3/0362 |
| | | | 341/35 |
| 2013/0027305 A1* | 1/2013 | Peng | G06F 3/03543 |
| | | | 345/163 |
| 2017/0262083 A1* | 9/2017 | Huang | G06F 3/03543 |
| 2018/0267629 A1* | 9/2018 | Lin | G06F 3/0362 |
| 2019/0025947 A1* | 1/2019 | Wei | G06F 3/0383 |
| 2019/0094994 A1* | 3/2019 | Tsai | G06F 3/0362 |
| 2020/0159341 A1* | 5/2020 | Unnikrishnan | G06F 3/0362 |

* cited by examiner

*Primary Examiner* — Benjamin C Lee
*Assistant Examiner* — Emily J Frank
(74) *Attorney, Agent, or Firm* — Kilpatrick Townsend & Stockton LLP

(57) ABSTRACT

Disclosed are computer peripheral interface devices (such as computer mice) that include a wheel member configured to rotate around an axis in a plurality of modes, where each of the plurality of modes corresponds to a respective unique friction profile. The plurality of operation modes includes a freewheel mode and at least two additional modes. The at least two additional modes includes two or more different ratchet modes, two or more different constant friction modes, or at least one constant friction mode and at least one ratchet mode. The interface device also includes an actuator assembly configured to set the wheel member to each of the plurality of operation modes.

2 Claims, 17 Drawing Sheets

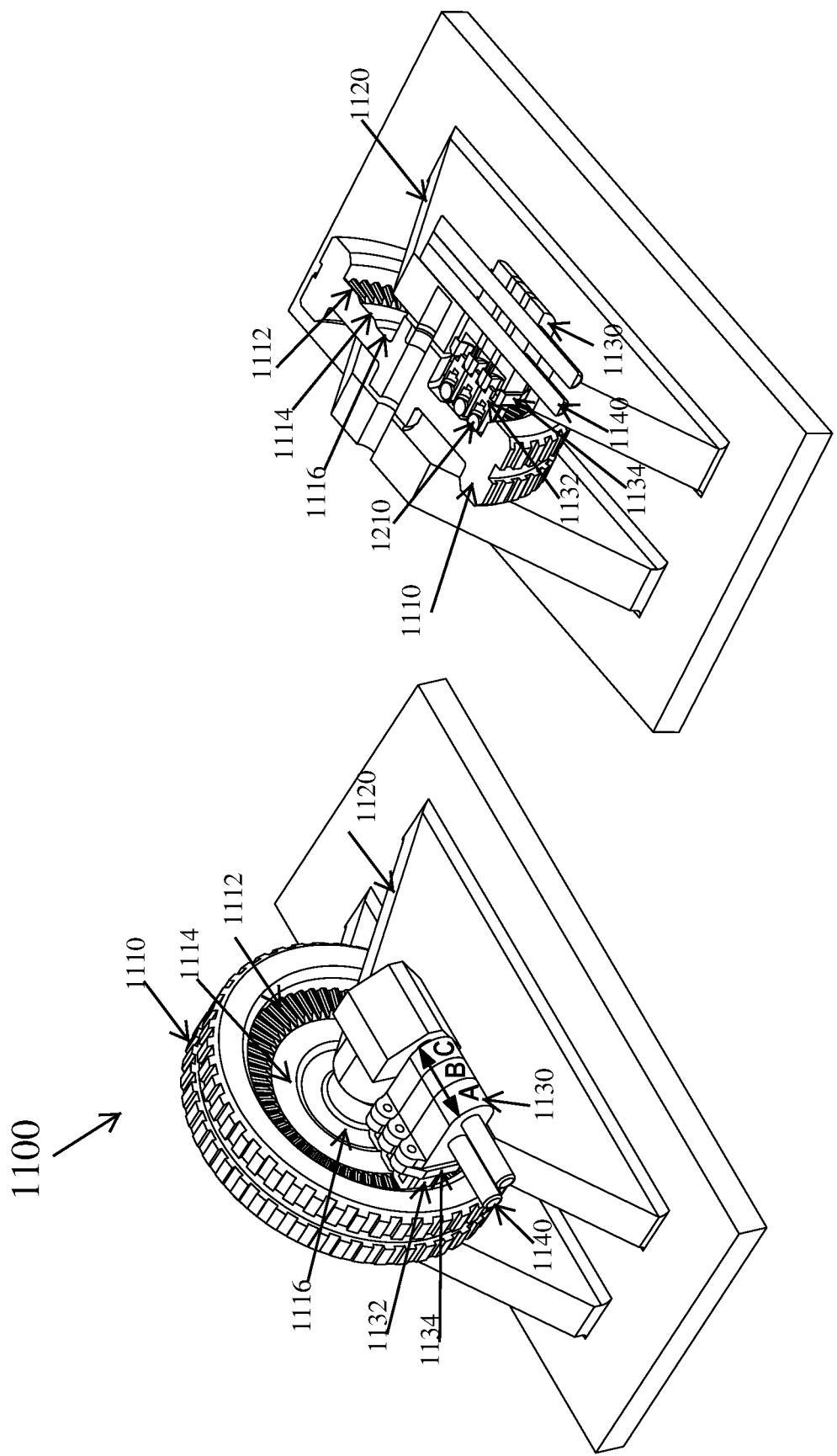

MULTI-MODE SCROLL WHEEL FOR INPUT DEVICE

CROSS-REFERENCE TO RELATED APPLICATIONS

The present application claims the benefit of and priority to U.S. Provisional Patent Application No. 62/690,591, filed on Jun. 27, 2018, entitled "Electromagnetic Mode Change of Peripheral Interface Wheel," the entire content of which is herein incorporated by reference for all purposes.

BACKGROUND

Unless otherwise indicated herein, the materials described in this section are not prior art to the claims in this application and are not admitted to be prior art by inclusion in this section.

Physical computer peripheral interface devices may include any auxiliary device that can be used to interface human and a computing device, such as a computer. Some examples of peripheral devices include keyboards, mice, joysticks, image scanners, speakers, microphones, web cameras, and more. Some of these physical computer peripheral interface devices can include wheel input elements that a user can manipulate in order to interface with the computing device. For example, computer mice can include scroll wheels that can be used to pan a viewing window across an image or document displayed by a computing device by rotating the scroll wheel around an axis. In many applications, a more precise scrolling and a more flexible and sensitive manipulation of the scroll wheel may allow a user to more precisely and more conveniently interact with the computing device for improved user experience with the computing devices and software applications, such as image or video editing and gaming programs and applications.

BRIEF SUMMARY

Disclosed are computer peripheral interface devices that include a wheel member configured to rotate around an axis in a plurality of modes, such as any combination of a freewheel mode, one or more ratchet modes, and one or more friction modes. Each of the plurality of modes may correspond to one or more friction profiles. The plurality of modes may be selected manually or automatically for specific user applications. In some embodiments, the plurality of modes may be selected by one or more mechanical, electrical, electromechanical, or electromagnetic actuators. Various inventive embodiments are described herein, including devices, systems, methods, non-transitory computer-readable storage media storing programs, code, or instructions executable by one or more processors, and the like.

According to some embodiments, a computer mouse may include a displacement sensor configured to detect movement of the computer mouse relative to a work surface, a scroll wheel configurable to rotate around an axis in a plurality of operation modes, an actuator assembly configured to set the scroll wheel to each of the plurality of operation modes, and a friction applying assembly including a first member and a second member. The plurality of operation modes may include a freewheel mode, a constant friction mode, and a ratchet mode. The scroll wheel may be configurable to receive a respective unique friction profile for each of the plurality of operation modes. The first member of the friction applying assembly may be coupled to or included in the scroll wheel. The second member of the friction applying assembly may be coupled to or included in the actuator assembly, and may be configurable to mechanically or electromagnetically apply the respective unique friction profile for each of the plurality of operation modes.

According to some embodiments, an interface device may include a displacement sensor configured to detect movement of the interface device relative to a work surface, a wheel member configurable to rotate around an axis in a plurality of operation modes, and an actuator assembly configured to set the wheel member to each of the plurality of operation modes. Each operation mode may be associated with a respective unique friction profile. The plurality of operation modes may include a freewheel mode and at least two additional modes, where the at least two additional modes may include two or more different ratchet modes, two or more different constant friction modes, or at least one constant friction mode and at least one ratchet mode. In some embodiments, the actuator assembly may include a direct current motor, a servo motor, a stepper motor, a solenoid, a voice coil motor, or a linear motor.

In some embodiments of the interface device, the wheel member may be configured to decelerate at a rate below 500 rpm per second in the freewheel mode. In some embodiments, the wheel member may lose less than 30% of total rotational energy per second in the freewheel mode. In some embodiments, the wheel member may be configured to receive less than 0.05 millinewton-meter of braking toque in the freewheel mode.

In some embodiments, in each of the two or more constant friction modes or the at least one constant friction mode, a constant friction force may be applied to the wheel member by a friction applying assembly. In the freewheel mode, no friction force may be applied to the wheel member by the friction applying assembly. In each of the two or more ratchet modes or the at least one ratchet mode, the respective unique friction profile may include a plurality of periodic segments. In some embodiments, the plurality of periodic segments may include 50 or more periodic segments. In some embodiments, the respective unique friction profile in any ratchet mode may include a triangle wave, a parabola, a sinusoidal wave, a square wave, an ascending ramp, or a descending ramp.

In some embodiments, the wheel member may include a cavity, a side wall of the cavity including two or more zones arranged in an axial direction of the wheel member. A first zone of the two or more zones may include a plurality of teeth, and a second zone of the two or more zones may include a circularly curved even surface. The actuator assembly may include a carriage and two arms coupled to the carriage, where the carriage may be configured to move in a radial direction of the wheel member, a first arm of the two arms may be configured to contact the first zone when the carriage is at a first location, a second arm of the two arms may be configured to contact the second zone when the carriage is at a second location, and the first arm and the second arm may be in no contact with the first zone and the second zone, respectively, when the carriage is at a third location. In some embodiments, each of the two arms may be coupled to the carriage through a spring. In some embodiments, the second arm may include a friction pad for contacting the second zone, where the friction pad may include a solid friction material. In some embodiments, the first arm may include a contact ball for contacting the first zone.

In some embodiments, the wheel member may include a plurality of ring-shaped zones on a side surface of the wheel member, where the plurality of ring-shaped zones may be arranged in a radial direction of the wheel member. A first zone of the plurality of ring-shaped zones may include a plurality of teeth. A second zone of the plurality of ring-shaped zones may have an even surface. The actuator assembly may include a sliding block configured to move in the radial direction of the wheel member, and a contact ball coupled to the sliding block through a spring. The contact ball may be configured to contact the first zone when the sliding block is at a first location aligned with the first zone. The contact ball may be configured to contact the second zone when the sliding block is at a second location aligned with the second zone. In some embodiments, a third zone of the plurality of ring-shaped zones may have a surface lower than the even surface of the second zone, and the contact ball may be configured to be separate from the third zone when the sliding block is at a third location aligned with the third zone.

In some embodiments, the wheel member may include a plurality of contact zones. The actuator assembly may include a barrel cam including a cutout region, a follower riding in the cutout region, and an arm coupled to the follower. The arm may contact different contact zones of the plurality of contact zones when the barrel cam is rotated. In some embodiments, the wheel member may include a ferromagnetic component, and the actuator assembly may include a electro permanent magnet.

In some embodiments of the interface device, the wheel member may include a cavity, where a side wall of the cavity may include a plurality of teeth. The axis may be coupled to a friction gear through a viscous material layer at an interface between the axis and the friction gear. The actuator assembly may include a rotatable arm, where the rotatable arm may include a contact head and a locking tooth. The contact head may be configured to contact the side wall when the rotatable arm is at a first position. The locking tooth may be configured to engage with and lock the friction gear when the rotatable arm is at a second position. The contact head and the locking tooth may be configured to be separate from the side wall and the friction gear, respectively, when the rotatable arm is at a third position. In some embodiments, the viscous material layer may include a damping grease.

In some embodiments of the interface device, the axis may be coupled to a friction gear through a viscous material layer at an interface between the axis and the friction gear. The actuator assembly may include a sliding block that includes a lock. The lock may be configured to engage with and lock the friction gear when the sliding block is at a first position, to set the wheel member to a constant friction mode. The lock may also be configured to disengage from the friction gear, when the sliding block is at a second position, such that the friction gear may rotate with the wheel member in the freewheel mode.

BRIEF DESCRIPTION OF THE DRAWINGS

Aspects and features of the various embodiments will be more apparent by describing examples with reference to the accompanying drawings, in which like reference numerals refer to like components or parts throughout the drawings.

FIG. 11 is a perspective view of an example multi-mode input device including a linear actuator for mode switching according to certain embodiments.

FIG. 12 is a cross-sectional view of an example multi-mode input device including a linear actuator for mode switching according to certain embodiments.

DETAILED DESCRIPTION

Figure 1:
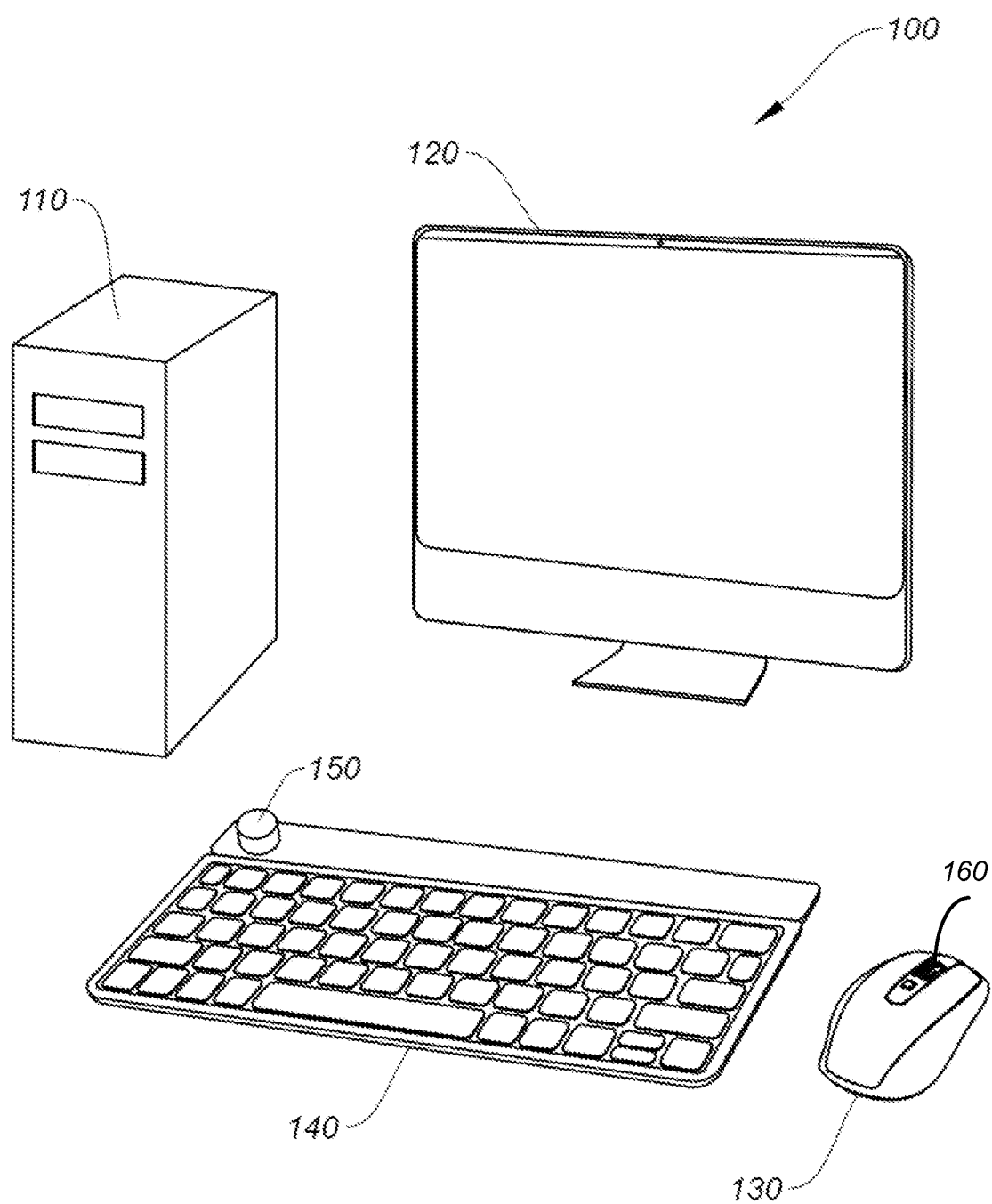
FIG. 1 shows an example of a system utilizing an input device according to certain embodiments.

Techniques disclosed herein relate generally to a computer peripheral interface device, and more specifically, to a user-manipulable multi-mode input device for a computing system. In many computing systems, an input device in a compact design that can operate in two or more different operation modes for different user applications and performance requirements and includes a mechanism for accurately and robustly switching among the two or more operation modes is desired to improve user experience and/or productivity with the input device. In one embodiment, a computer peripheral interface device may include a wheel member (e.g., a scroll wheel) configured to rotate around an axis in a plurality of operation modes, such as any combination of a freewheel mode, one or more ratchet modes, and one or more friction modes. Each of the plurality of operation modes may correspond to one or more friction profiles. The plurality of modes may be selected manually or automatically for specific user applications. In various embodiments, the plurality of operation modes may be selected or switched by one or more mechanical, electrical, electromechanical, or electromagnetic actuators. Different mechanisms that can be used to change the friction profile applied to a wheel of a peripheral input device are disclosed herein. Each of the mechanisms may provide different power usage, noise, user feeling and touch, and actuation time characteristics.

In some embodiments, the wheel member of a computer peripheral interface device can be set or switched to work in a ratchet mode, where the scroll wheel, when rotated in one direction, may experience a finite number (e.g., 10-100) of periodic segments of relatively high friction. In some embodiments, each periodic segment may associate with a same friction profile that may include different levels of friction setting. In some embodiments, the different periodic segments may associate with different friction profiles. The friction profiles may include, for example, a triangle wave, a parabola, a sine wave, a square wave, a linear ramp, and the like. Different segments may be used to select from, for example, a number of available paint brushes in Photoshop®, a number of available font sizes, and the like. The ratchet mode can also allow a user to have a greater control when panning through a document because a single finger movement to rotate the wheel may result in a metered panning of a view. In some embodiments, a user or a computer application may selectively enable a friction profile from a plurality of ratchet mode friction profiles of the scroll wheel to change the behavior of the scroll wheel in the ratchet mode according to, for example, a corresponding computer application, intended use, or user preference.

In some embodiments, the wheel member of a computer peripheral interface device can be set or switched to work in a non-ratchet mode, such as a freewheel mode or a friction mode. Non-ratchet modes may be used for analog settings that may have a continuous or high number of settings (e.g., >100), such as a selection of a color from a band of hundreds, thousands, or millions of available colors, a scroll bar (e.g., to scroll through a 100+ page document), an audio volume, or the like. For example, in some embodiments, the wheel member of computer peripheral interface device can be set or switched to work in a freewheel mode, where the scroll wheel is disengaged from a friction mechanism and thus can be rotated around an axis at a substantially frictionless state (e.g., with a torque less than 0.05 mNm, with a deceleration below 500 rpm per second, or with a total rotational energy loss rate less than 30% per second) and relatively constant coefficient of friction, such that the wheel member may continue to rotate around the axis at a substantial speed even after the externally exerted force is removed. In the freewheel mode, a user can, for example, swiftly pan the view over a document with a single finger movement to rotate the wheel.

In some embodiments, the wheel member of the computer peripheral interface device can be set or switched to work in a friction mode, where the scroll wheel may have a constant friction (or resistance) that is much higher than the friction (or resistance) in the freewheel mode. The friction mode may allow the scroll wheel to replicate the feeling of scrolling on a touch pad. The friction mode may allow a more precise control compared to the freewheel mode. For example, when zooming in or out on a map in the freewheel mode, the map may zoom in or out too fast. The friction mode can allow a higher level of accuracy in such situations. In some embodiments, the friction mode may be created using a mechanism that allows frictions (either dry friction or wet friction) to be applied to the wheel while rotating the wheel. The dry friction can be achieved, for example, using a friction material under a force to provide resistance to the wheel rotation. The wet friction can be achieved, for example, using a damping grease between a stationary component and a rotating component to provide the resistance to the rotation.

In various embodiments, the wheel member may be configurable to work in multiple operation modes that may include any combination of the freewheel mode, one or more constant friction modes, and one or more ratchet modes. In some embodiments, the wheel member may only be scrolled in one direction in some operation modes. For example, if the bottom of a page is reached, the wheel member may be set to an operation mode where the wheel member can only be scrolled up.

In some embodiments, the multiple operation modes of the wheel member of the computer peripheral interface device can be selected manually through, for example, an electronic switch (e.g., an electric motor, such as a stepper motor, servo motor, or DC motor), a mechanical actuator (e.g., a slider mechanism or a ratchet), or an electromagnetic actuator (e.g., a solenoid or a voice coil motor). In some embodiments, one actuator may be used to select any of the multiple operation modes. In some embodiments, two or more actuators may be used in combination to switch among the multiple modes. For example, one actuator may be used to switch between the ratchet mode and freewheel mode (e.g., using a DC motor), and another actuator may be used to switch between the freewheel mode and friction mode.

In some embodiments, the operation modes can be user specific or application specific. For example, the configuration or setting of the operation modes may be customized for different users or applications. In some embodiments, the operation modes may be automatically switched by a user application based on, for example, content being displayed to the user.

It may be challenging to include more than two different operation modes (or friction profiles) of the wheel member in a compact computer peripheral interface device (e.g., a computer mouse, a game controller, or a virtual reality controller), and to use one actuator to reliably and precisely switch among the more than two operation modes. It may be difficult and/or expensive to manufacture such compact computer peripheral interface devices, especially in high volume. Furthermore, it may be difficult to design and manufacture an interface device having a wheel that can work in a freewheel mode but would not inadvertently rotate, for example, due to weight unbalance, in particular, when the wheel is a vertical wheel.

Various embodiments disclosed herein can be used to achieve two or more different operation modes (or friction profiles) of the wheel member in a compact design and can include mechanisms for accurately and robustly switch among the two or more operation modes (or friction profiles), and thus can significantly improve user experience and/or productivity with the computer peripheral interface device.

While certain embodiments are described herein, these embodiments are presented by way of example only, and are not intended to limit the scope of protection. The apparatuses and systems described herein may be embodied in a variety of other forms. Furthermore, various omissions, substitutions, and changes in the form of the example methods and systems described herein may be made without departing from the scope of protection.

FIG. 1 shows an example of a system 100 utilizing a user-manipulable element (e.g., a scroll wheel 160) on an input device 130 (e.g., a computer mouse) according to certain embodiments. System 100 may include a computer 110, a display 120, input device 130, and another input device (e.g., a keyboard 140). Keyboard 140 can also include a user-manipulable element (e.g., a knob 150). For system 100, input device 130 and keyboard 140 can be configured to control aspects of computer 110 and display 120, as would be understood by one of ordinary skill in the art. Computer 110 can be referred to as a "host computer" or a "host computing device."

Computer 110 may include a machine readable medium (not shown) that is configured to store computer code, such as driver software or firmware, and the like, where the computer code may be executable by a processor of computer 110 to control input device 130 and/or keyboard 140 by computer 110 or to control computer 110 by input device 130 and/or keyboard 140. The various embodiments described herein generally refer to input device 130 as a computer mouse or similar input device. For example, input device 130 may be a computer mouse that includes a displacement sensor configured to detect movement of input device 130 across a work surface, such as a desk top, to control the movement of a pointer or the like on display 120. The displacement sensor may include an optical sensor, a mechanical sensor, an opto-mechanical sensor, or the like. However, it should be understood that input device 130 can be any input/output (I/O) device, user interface device, control device, input unit, or the like. Thus, techniques disclosed herein may be used in other device, such as virtual reality controllers, knobs, joysticks, throttle controllers, and the like.

The user-manipulable element is generally described as a scroll wheel throughout this disclosure. However, it should be understood that any suitable user-manipulable element can be used, such as a button, knob, trackball, joystick, slider, or the like, as would be understood by one of ordinary skill in the art.

In the descriptions for some embodiments, system 100 is generally referred to as a desktop or laptop computing device. However, it should be understood that system 100 can be any suitable computing device further including a tablet computer, a smart phone, a virtual or augmented reality interface (e.g., having 2D or 3D displays), a holographic interface, a controller for an instrument, or the like. One of ordinary skill in the art would understand the many variations, modifications, and alternative embodiments thereof.

Figure 2:
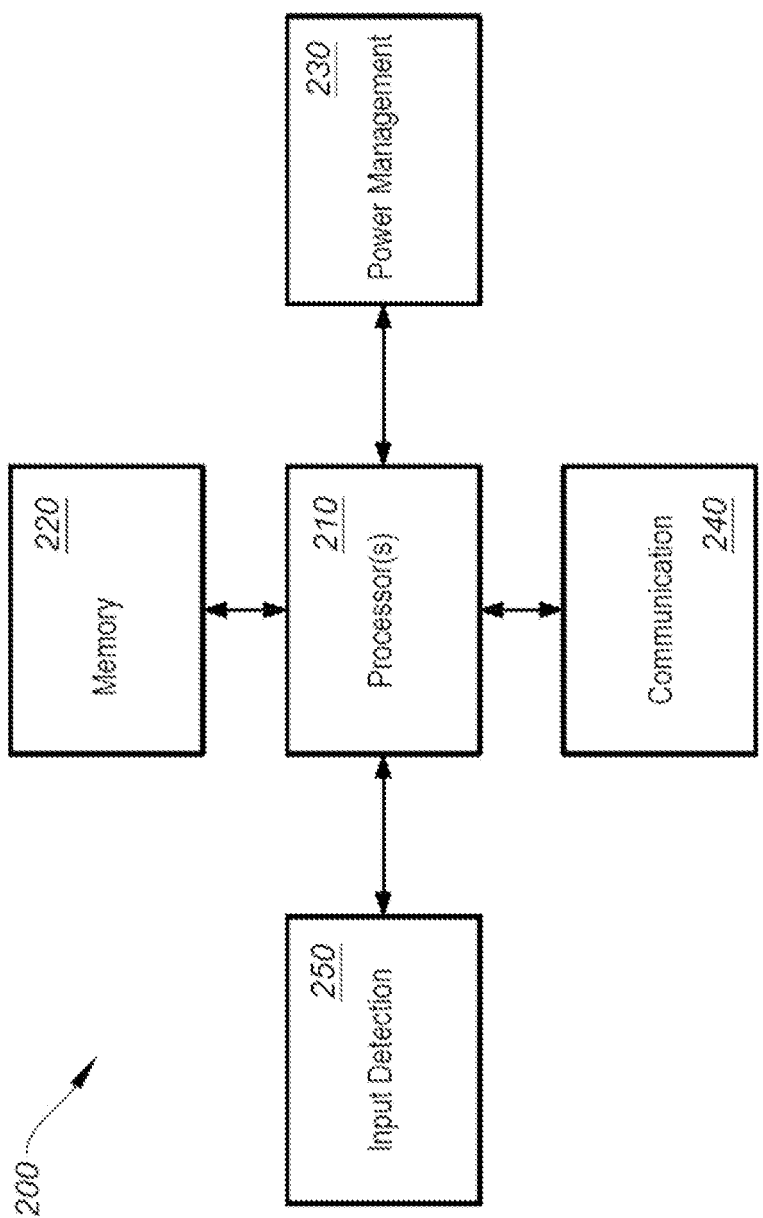
FIG. 2 is a simplified block diagram of an example of a system for operating an input device according to certain embodiments.

FIG. 2 shows a system 200 for operating an input device (e.g., input device 130) according to certain embodiments. System 200 may include processor(s) 210, memory 220, a power management system 230, a communication system 240, and an input detection module 250. Each of the system blocks 220-250 can be in electrical communication with the processor(s) 210 (e.g., via a bus system). System 200 may also include additional functional blocks that are not shown or discussed to prevent obfuscation of the novel features described herein. System blocks 220-250 may be implemented as separate modules, or alternatively, more than one system block may be implemented in a single module. In the context described herein, input device can be a mouse with a scroll wheel, such as input device 130 with scroll wheel 160, as described above with respect to FIG. 1.

In certain embodiments, processor(s) 210 may include one or more microprocessors and can be configured to control the operation of system 200. Alternatively, processor(s) 210 may include one or more microcontrollers (MCUs), digital signal processors (DSPs), or the like, with supporting hardware and/or firmware (e.g., memory, programmable I/Os, etc.), as would be appreciated by one of ordinary skill in the art. Processor(s) 210 can control some or all aspects of operation of input device 130 (e.g., system block 220-250). Alternatively or additionally, some of system blocks 220-250 may include an additional dedicated processor, which may work in conjunction with processor(s) 210. One of ordinary skill in the art would understand the many variations, modifications, and alternative embodiments thereof.

Memory 220 may be configured to store information pertaining to one or more operational configurations of input device 130. As further discussed below, one or more operational configurations of input device 130 may include setting performance characteristics of scroll wheel 160, including but not limited to, a rotation resistance of the scroll wheel, a rotational input resolution of the scroll wheel (e.g., rotation sensitivity), setting a ratchet or non-ratchet mode of operation to the scroll wheel based on the properties of the editable parameter, a function of a depressible scroll wheel, a sensitivity of one or more touch sensors on scroll wheel 160, functions associated with multiple detected touches on scroll wheel 160 (by the touch sensors), their corresponding locations, and the like, as further discussed below.

Additionally, memory 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for processing by processing devices. Software can be implemented as a single program or a collection of separate programs and can be stored in non-volatile storage and copied in whole or in-part to volatile working memory during program execution.

Power management system 230 can be configured to manage power distribution, recharging, power efficiency, and the like, for input device 130. In some embodiments, power management system 230 can include a battery (not shown), a USB based recharging system for the battery (not shown), and power management devices (e.g., low-dropout voltage regulators—not shown). In certain embodiments, the functions provided by power management system 230 may be incorporated into processor(s) 210. The power source can be a replaceable battery, a rechargeable energy storage device (e.g., super capacitor, Lithium Polymer Battery, NiMH, NiCd), or a corded power supply. The recharging system can be an additional cable (specific for the recharging purpose) or it can use a USB connection to recharge the battery.

Communications system 240 can be configured to provide wireless communication with computer 110, or other devices and/or peripherals, according to certain embodiments. Communications system 240 can be configured to provide radio-frequency (RF), Bluetooth®, infra-red (IR), ZigBee®, or other suitable communication technology to communicate with other computing devices and/or peripheral devices. System 200 may optionally comprise a hardwired connection to computer 110. For example, input device 130 can be configured to receive a Universal Serial Bus (USB) cable to enable bi-directional electronic communication with computer 110 or other external devices. Some embodiments may utilize different types of cables or connection protocol standards to establish hardwired communication with other entities.

Input detection module 250 can control the detection of a user-interaction with input elements on input device 130. For instance, input detection module 250 can detect user inputs on scroll wheel 160, presses on the various buttons of input device 130, or other suitable input elements or device such as a media control button, touch sensors (e.g., touch pads) and the like. In some embodiments, input detection module 250 can work in conjunction with memory 220 to detect inputs on input device 130 and associate various functions with each input element (e.g., scroll wheel 160).

Although certain systems may not expressly discussed, they should be considered as part of system 200, as would be understood by one of ordinary skill in the art. For example, system 200 may include a bus system to transfer power and/or data to and from the different systems therein.

It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to a knob, keypad, or other similar input device. For instance, aspects of system 200 can be applied to knob 150. Further, system 200 can be applied to any of the input devices described in the embodiments herein, whether explicitly, referentially, or tacitly described (e.g., would have been known to be applicable to a particular input device by one of ordinary skill in the art). The foregoing embodiments are not intended to be limiting and those of ordinary skill in the art with the benefit of this disclosure would appreciate the myriad applications and possibilities.

Figure 3:
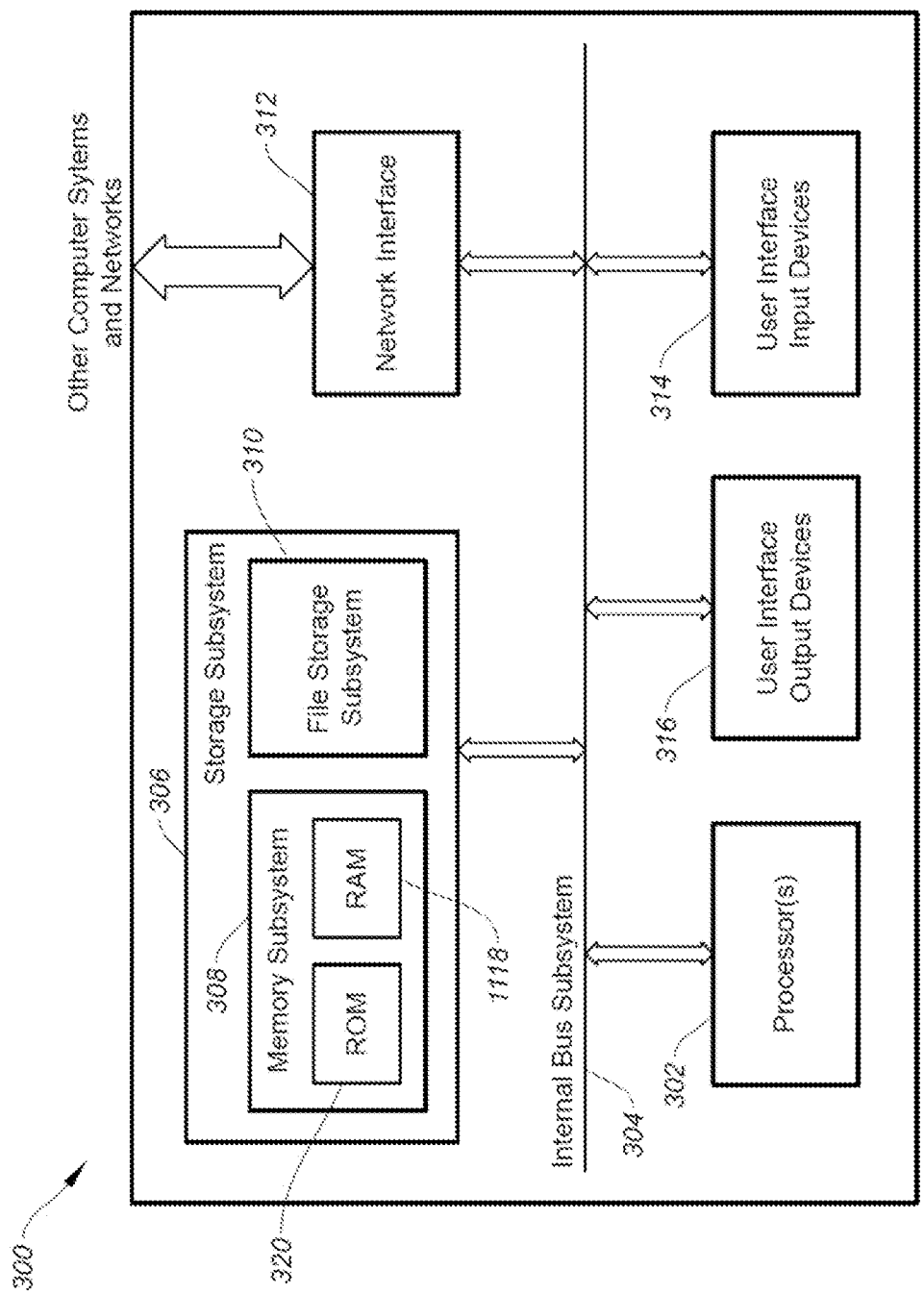
FIG. 3 illustrates a system for implementing certain features of peripheral input devices disclosed herein according to certain embodiments.

FIG. 3 shows a system 300 for implementing certain features of peripheral input devices disclosed herein according to certain embodiments. System 300 can be used to implement any of the host computing devices discussed herein and the myriad embodiments described herein or within the purview of this disclosure but not necessarily explicitly described. System 300 can include one or more processors 302 that can communicate with a number of peripheral devices (e.g., input devices) via a bus subsystem 304. These peripheral devices can include storage subsystem 306 (comprising memory subsystem 308 and file storage subsystem 310), user interface input devices 314, user interface output devices 316, and network interface subsystem 312. User interface input devices 314 can be any of the input device types described herein (e.g., keyboard, computer mouse, remote control, etc.). User interface output devices 316 can be a display of any type, including computer monitors, displays on handheld devices (e.g., smart phones, gaming systems), or the like, as would be understood by one of ordinary skill in the art. Alternatively or additionally, a display may include virtual reality (VR) displays, augmented reality displays, holographic displays, and the like, as would be understood by one of ordinary skill in the art.

In some examples, internal bus subsystem 304 can provide a mechanism for letting the various components and subsystems of computer system 300 communicate with each other as intended. Although internal bus subsystem 304 is shown schematically as a single bus, alternative embodiments of the bus subsystem can utilize multiple buses. Additionally, network interface subsystem 312 can serve as an interface for communicating data between computer system 300 and other computer systems or networks. Embodiments of network interface subsystem 312 can include wired interfaces (e.g., Ethernet, CAN, RS232, RS485, etc.) or wireless interfaces (e.g., Bluetooth®, BLE, ZigBee®, Z-Wire®, Wi-Fi, cellular protocols, etc.).

In some cases, user interface input devices 314 can include a computer mouse (such as input device 130), a presenter, a pointing device (e.g., mouse, trackball, touchpad, etc.), a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 300. Additionally, user interface output devices 316 can include a display subsystem, a printer, or non-visual displays such as audio output devices, etc. The display subsystem can be any known type of display device. In general, use of the term "output device" is intended to include all possible types of devices and mechanisms for outputting information from computer system 300.

Storage subsystem 306 can include memory subsystem 308 and file storage subsystem 310. Memory subsystems 308 and file storage subsystem 310 represent non-transitory computer-readable storage media that can store program code and/or data that provide the functionality of embodiments of the present disclosure. In some embodiments, memory subsystem 308 can include a number of memories including main random access memory (RAM) 318 for storage of instructions and data during program execution and read-only memory (ROM) 320 in which fixed instructions may be stored. File storage subsystem 310 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 300 is illustrative and not intended to limit embodiments of the present disclosure. Many other configurations having more or fewer components than system 300 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

As described above, a peripheral input device used as an interface between a user and a computing device, such as a computer mouse, a game controller, or a VR controller, may include a wheel member as a physical control element. A user may rotate the wheel member to cause a corresponding command to be sent to the computing device. An example of such a wheel member is a scroll wheel that may be located between the left and right buttons on the peripheral input device (e.g., a mouse). Scroll wheels can be used to pan a field of view of a computer display. For example, a scroll wheel can be used by a user to scroll through a view of a document displayed on a computer screen or zoom in or out images or 3-D objects.

In many applications, a more precise scrolling and a more versatile and sensitive manipulation of the scroll wheel may allow a user to more precisely and more conveniently interact with the computing device for improved user experience with the computing devices and software applications, such as image or video editing and gaming. To provide the flexibility, precision, and convenience, multiple operation modes that can be manually or automatically switched may be desired, where the different operation modes may be used to provide different friction levels or friction profiles, which can then be translated into different commands for specific user applications.

According to certain embodiments, a computer peripheral interface device may include a wheel member configured to rotate around an axis in a plurality of modes, such as any combination of a freewheel mode, one or more ratchet modes, and one or more friction modes, that may be selected manually or automatically for specific user applications. Each of the plurality of modes may correspond to one or more friction profiles.

Figure 4C:
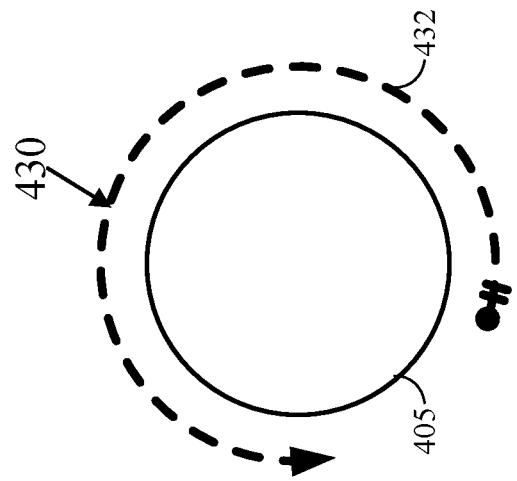
FIG. 4C illustrates an example friction profile for a ratchet mode of an input device according to certain embodiments.
Figure 4B:
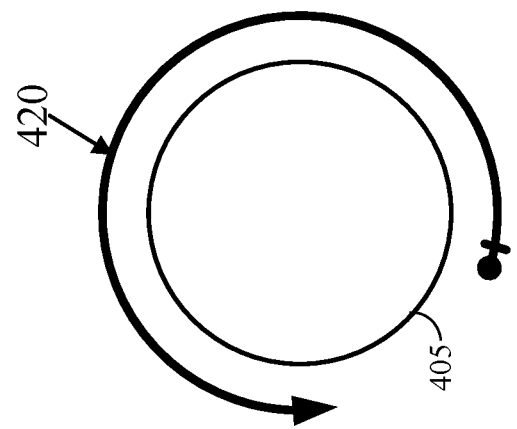
FIG. 4B illustrates an example friction profile for a friction mode of an input device according to certain embodiments.
Figure 4A:
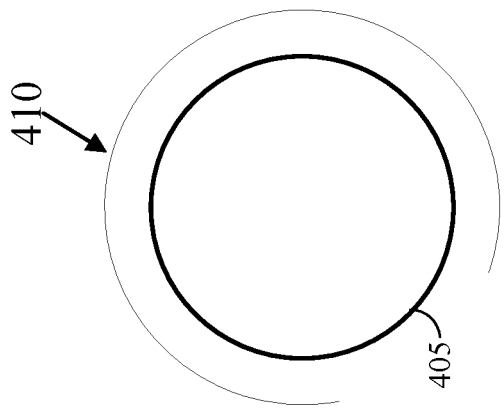
FIG. 4A illustrates an example friction profile for a freewheel mode of an input device according to certain embodiments.

FIG. 4A illustrates an example friction profile 410 for a freewheel mode of a scroll wheel 405 on an input device according to certain embodiments. In the freewheel mode, scroll wheel 405 may be rotated rapidly, and little or no resistance (or friction) may be overcome in order to rotate scroll wheel 405. Once rotated, scroll wheel 405 may continue to rotate even if no external force is applied on it. Scroll wheel 405 may be set to the freewheel mode by disengaging scroll wheel 405 from an artificial friction mechanism such that scroll wheel 405 can be rotated around an axis with little or no resistance (or friction).

FIG. 4B illustrates an example friction profile 420 for a friction mode of scroll wheel 405 according to certain embodiments. In the friction mode, scroll wheel 405 may have a constant friction (or resistance) that is much higher than the friction (or resistance) in the freewheel mode. The friction mode may allow a more precise experience compared to the freewheel mode. For example, when zooming in or out on a map in the freewheel mode, the map may zoom in or out too fast, while the friction mode may allow a higher level of accuracy in such situations. In some embodiments, the friction mode may be created using a mechanism that allows either dry friction or wet friction to be applied to the wheel. For example, scroll wheel 405 may be set to the friction mode by pressing a component with a friction material against another component to provide the desired level of resistance to the wheel rotation. The resistance or friction level may be changed by changing the friction material and/or the pressing force. In another embodiment, scroll wheel 405 may be set to the friction mode by latching a component to make it stationary and using a damping grease between the stationary component and scroll wheel 405 to provide the resistance to the rotation.

FIG. 4C illustrates an example friction profile 430 for a ratchet mode of scroll wheel 405 according to certain embodiments. Friction profile 430 may include a number of segments 432, such as about 10 to about 100 segments. Each segment 432 may correspond to a different friction or resistance level. Thus, by turning scroll wheel 405, a number of discrete settings may be selected. Friction profile 430 may include any desired profile, where the friction or resistance levels of segments 432 may be of any combination of friction levels.

Figure 5A:
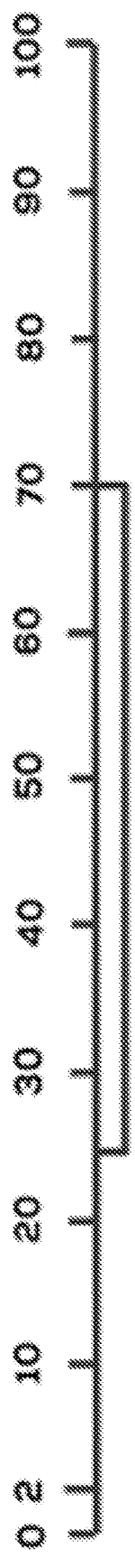
FIG. 5A illustrates the number of ratchets in the ratchet mode for an example of an input device according to certain embodiments.

FIG. 5A illustrates the number of ratchets in the ratchet mode for an example scroll wheel in an input device according to certain embodiments. The example scroll wheel may have many numbers of ratchets (e.g., notches or teeth), such as 24 ratchets. In various embodiments, the scroll wheel may have, for example, about 10 to about 100 ratchets.

Figure 5B:
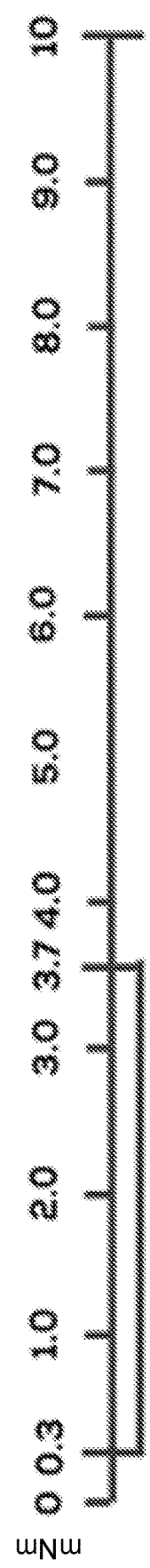
FIG. 5B illustrates the range of friction torque in the ratchet mode for an example of an input device according to certain embodiments.

FIG. 5B illustrates the range of force in the ratchet mode for an example scroll wheel in an input device according to certain embodiments. As shown the example scroll wheel may provide a torque with an absolute value between about 0.3 millinewton meter (mNm) and about 3.7 millinewton meters. In various embodiments, the scroll wheel may provide a torque with an absolute value in the range of about 0 to about 10 millinewton meters.

Figure 5C:
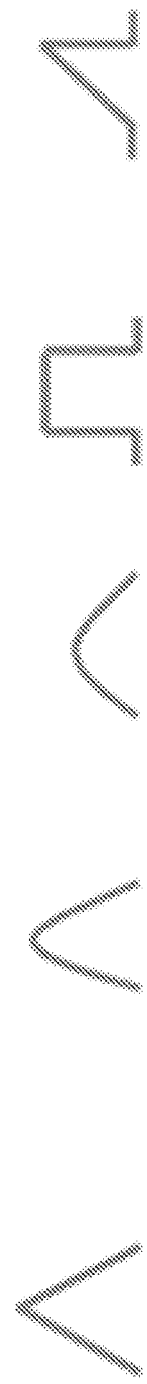
FIG. 5C illustrates various ratchet mode friction profiles for input devices according to certain embodiments.

FIG. 5C illustrates various examples of ratchet mode friction profiles for scroll wheels in input devices according to certain embodiments. For example, the friction profile of a scroll wheel may be in the shape of a triangle wave with a rising ramp and a falling ramp, a parabola, a sine wave, a square, a linear ramp, etc. When the scroll wheel is rotated, the friction level of the scroll wheel may change according to the friction profile.

As described above, it may be challenging to include two or more different operation modes (or friction profiles) of the scroll wheel in an input device and to use one actuator to reliably and precisely switch among the two or more operation modes. According to certain embodiments, a carriage structure may be used to implement the multiple operation modes and the switch among the multiple operation modes.

Figure 6A:
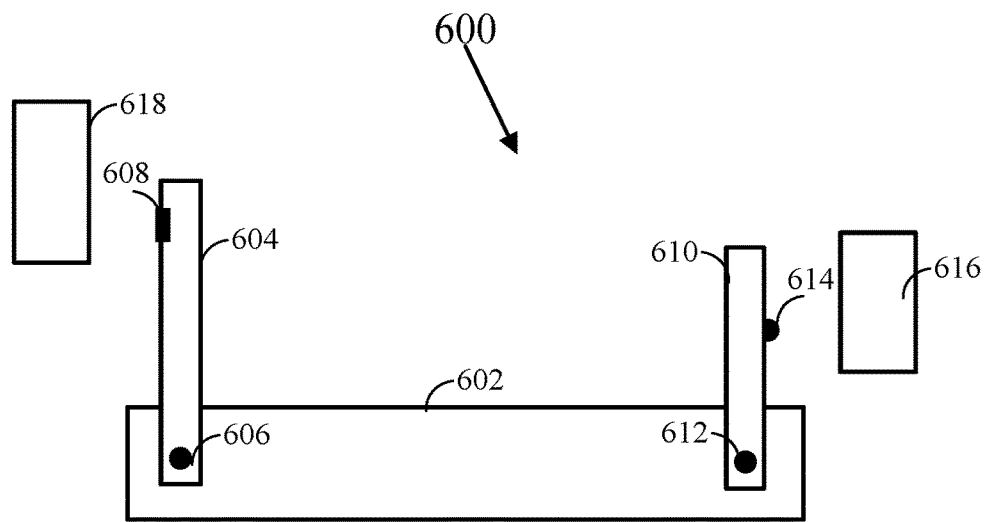
FIG. 6A illustrates an example of a multi-mode input device operating in a freewheel mode according to certain embodiments.
Figure 6B:
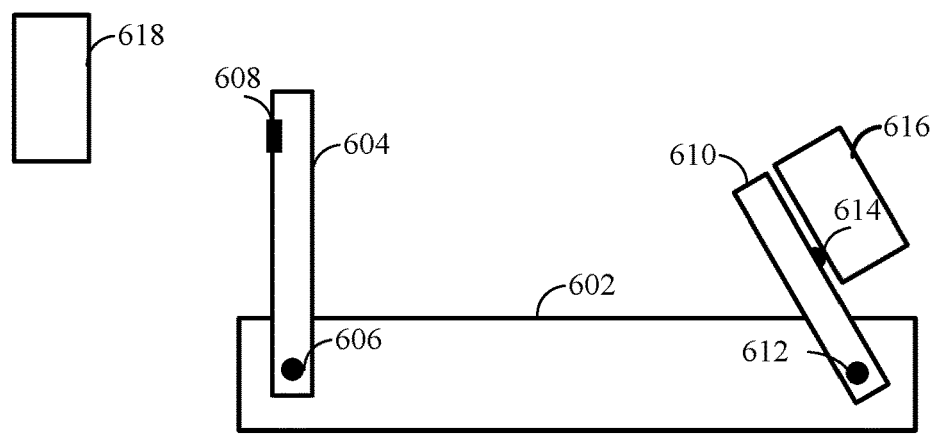
FIG. 6B illustrates an example of a multi-mode input device operating in a ratchet mode according to certain embodiments.
Figure 6C:
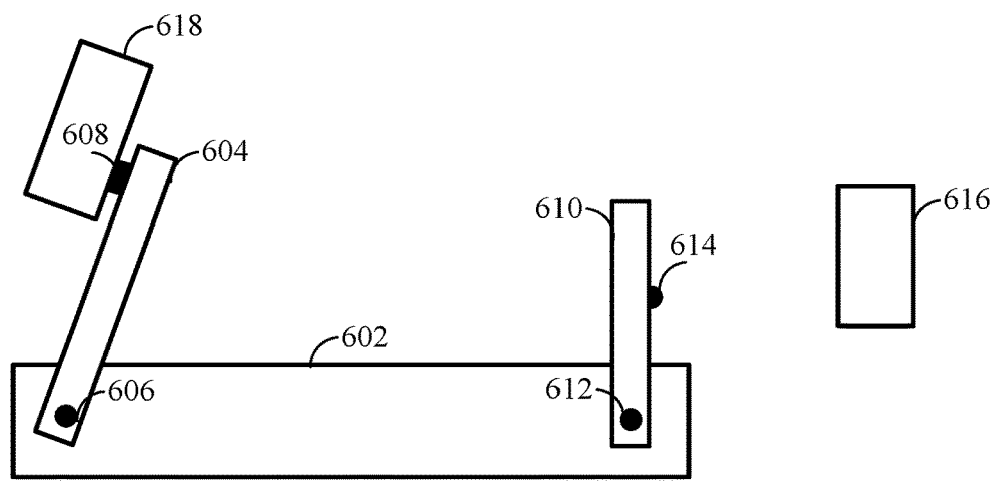
FIG. 6C illustrates an example of a multi-mode input device operating in a friction mode according to certain embodiments.

FIGS. 6A-6C illustrate an example multi-mode input device 600 including a carriage 602 according to certain embodiments. FIG. 6A illustrates multi-mode input device 600 operating in a freewheel mode according to certain embodiments. Multi-mode input device 600 may include carriage 602 and two rotatable arms 604 and 610 coupled to carriage 602 through hinges 606 and 612 or other pivot structures. Rotatable arm 604 may include a friction pad 608 that includes a friction material, such as a rubber, metal, or ceramic material. Rotatable arm 610 may include a contact ball 614 that may be partially embedded in rotatable arm 610. Contact ball 614 may be fixed with respect to rotatable arm 610, or may be rotatable with respect to rotatable arm 610, for example, when a tangential force is applied to contact ball 614. Multi-mode input device 600 may also include two contact members 616 and 618. Either contact members 616 and 618 or carriage 602 may be connected to or may be a part of a scroll wheel. For example, contact members 616 and 618 may be parts of a scroll wheel, such as different radial portions on a side of the scroll wheel or different axial regions of an internal cavity of the scroll wheel. Carriage 602 can be moved to different positions to engage with or disengage from contact members 616 and 618. In the freewheel mode, carriage 602 and both rotatable arms 604 and 610 may be disengaged from contact members 616 and 618. Because there is no contact between any rotatable arm and any contact member, there is no friction between any rotatable arm and any contact member, such that the scroll wheel may not experience additional friction caused by the contact between any rotatable arm and any contact member through the friction pad or the contact ball.

FIG. 6B illustrates example multi-mode input device 600 operating in a ratchet mode according to certain embodiments. Multi-mode input device 600 may be set to the ratchet mode by linearly translating carriage 602 to a first predetermined location, for example, using a DC motor or step motor, such that contact ball 614 may be in contact with contact member 616 and may press against contact member 616 at a certain force. Rotatable arm 610 may rotate around hinge 612 due to the contact, and the contact force may be caused by, for example, the deformation of a spring connected to rotatable arm 610 and holding rotatable arm 610 in place. Contact member 616 may include an uneven surface such that the friction between contact ball 614 and contact member 616 may vary at different regions of contact member 616 according to a predetermined friction profile as described above.

FIG. 6C illustrates example multi-mode input device 600 operating in a friction mode according to certain embodiments. Multi-mode input device 600 may be set to the friction mode by linearly translating carriage 602 to a second predetermined location, for example, using the DC motor or step motor, such that friction pad 608 may be in contact with contact member 618 and press against contact member 618 at a certain force. Rotatable arm 604 may rotate around hinge 606 due to the contact and the contact force may be caused by, for example, the deformation of a spring connected to rotatable arm 604 and holding rotatable arm 604 in place. Contact member 618 may have a substantially even surface. Thus, there may be a substantially constant friction between friction pad 608 and contact member 618 when the two move with respect to each other due to the rotation of the scroll wheel. The friction force or torque may be changed by changing the friction material of friction pad 608 or by changing the force between friction pad 608 and contact member 618. In this way, the scroll wheel may be switched to one of three or more modes by linearly and precisely translating carriage 602 (and thus the rotatable arms) to engage with or disengage from contact member 616 or 618.

In some embodiments, in a ratchet mode as shown in FIG. 6B and/or a constant friction mode as shown in FIG. 6C, the position of the carriage may be fine-tuned such that the contact force and thus the friction force may be adjusted.

Figure 7:
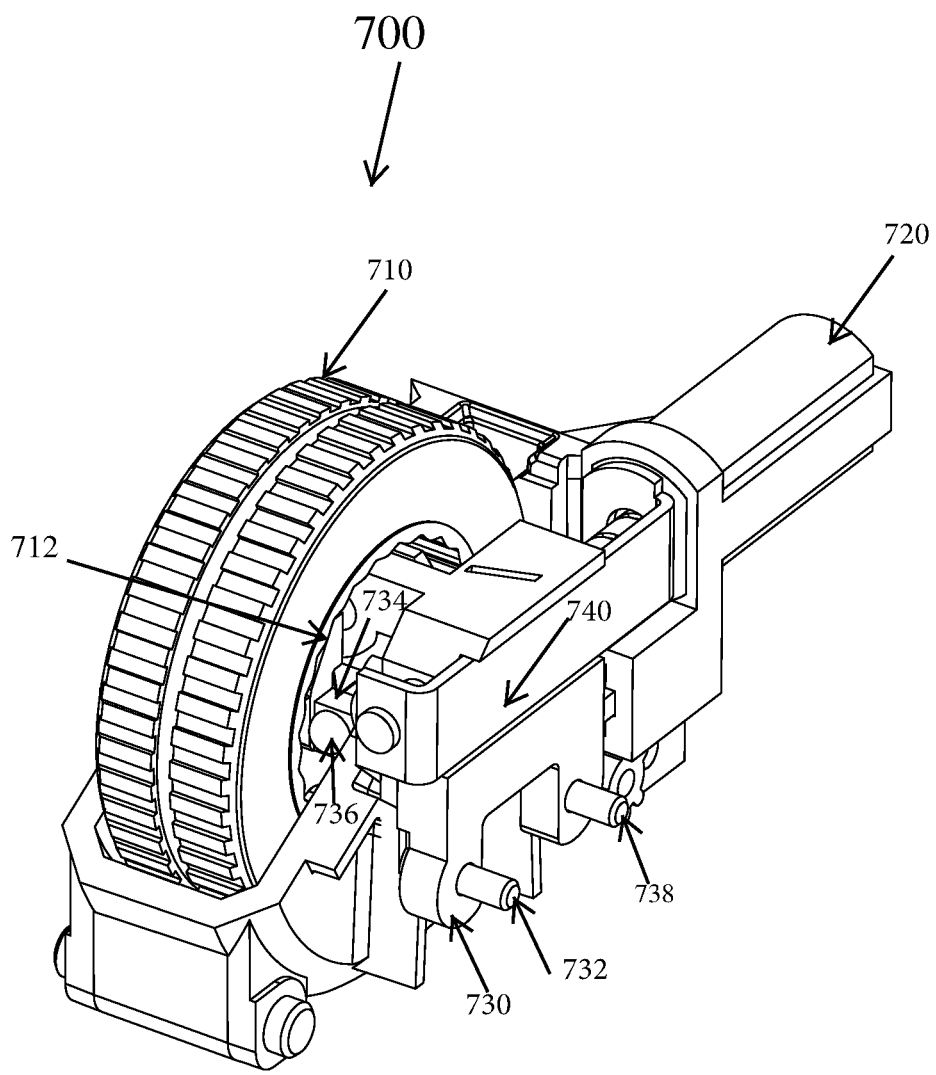
FIG. 7 shows a perspective view of an example of a multi-mode input device according to certain embodiments.

FIG. 7 shows a perspective view of an example of a multi-mode input device 700 that includes a carriage structure according to certain embodiments. Multi-mode input device 700 may include a scroll wheel 710 and an actuator assembly that may include a motor 720, a carriage 730, and a guide 740. Scroll wheel 710 may include a cavity on at least one side. The side wall of the cavity may include a plurality of zones in the axial direction, where each of the plurality of zones may correspond to one operation mode. For example, an outermost zone 712 may be used to provide frictions for the ratchet mode (hereinafter referred to as "ratchet mode zone"). Motor 720 may include, for example, a DC motor, a servo motor, a stepper motor, a linear motor, a solenoid (e.g., a tri-stable solenoid), or a voice coil motor (VCM). Motor 720 may be used to move carriage 730 along guide 740. The actuator assembly may also include two rotatable arms connected to carriage 730 through two hinges 732 and 738. Each rotatable arm may rotate around the corresponding hinge. The two rotatable arms may have different lengths and thus may extend into different depths of the cavity.

One of the rotatable arm is rotatable arm 734, which include a contact ball 736 partially embedded in rotatable arm 734. Rotatable arm 734 may extend into the cavity at a depth corresponding to the ratchet mode zone of the side wall. Thus, when carriage 730 is moved by motor 720 along guide 740 away from motor 720 to a first location, contact ball 736 on rotatable arm 734 may be in contact with the ratchet mode zone of the side wall. The ratchet mode zone of the side wall may include a predetermined pattern or height profile to provide different friction at different regions. Thus, when scroll wheel 710 is rotated by a user, contact ball 736 may be in contact with different regions of the ratchet mode zone, and thus the user and the scroll wheel may experience friction force of different magnitudes. In some embodiments, carriage 730 may be moved by motor 720 along guide 740 away from motor 720 to two or more different locations while maintaining the contact (but having different contact force) between contact ball 736 and the ratchet mode zone, such that scroll wheel 710 may operation at two or more different ratchet modes that have different friction profiles.

A second rotatable arm (not shown in FIG. 7) of the two rotatable arms may extend into the cavity at a depth corresponding to a zone of the side wall used to provide a substantially constant friction (hereinafter referred to as the "friction mode zone"). The second rotatable arm may include a friction pad at the head portion. When carriage 730 is moved by motor 720 along guide 740 towards motor 720 to a second location, the friction pad on the second rotatable arm may be in contact with the friction mode zone of the side wall. The friction mode zone of the side wall may include an even surface, where all points on the even surface may be at an equal distance from the axis of scroll wheel 710. Thus, the friction between the friction pad and different regions of the friction mode zone may be substantially equal. Therefore, when scroll wheel 710 is rotated, an substantially constant friction may exist between the friction pad of the second rotatable arm and different regions of the friction mode zone.

When carriage 730 is moved by motor 720 along guide 740 to a position between the first position and the second position, neither contact ball 736 of rotatable arm 734 nor the friction pad of the second rotatable arm may be in direct contact with scroll wheel 710. Thus, scroll wheel 710 may operate in the freewheel mode and may experience a very low or substantially zero friction. Therefore, by linearly translating carriage 730 by a motor, the scroll wheel may be switched among the ratchet mode, friction mode, and freewheel mode.

Figure 8:
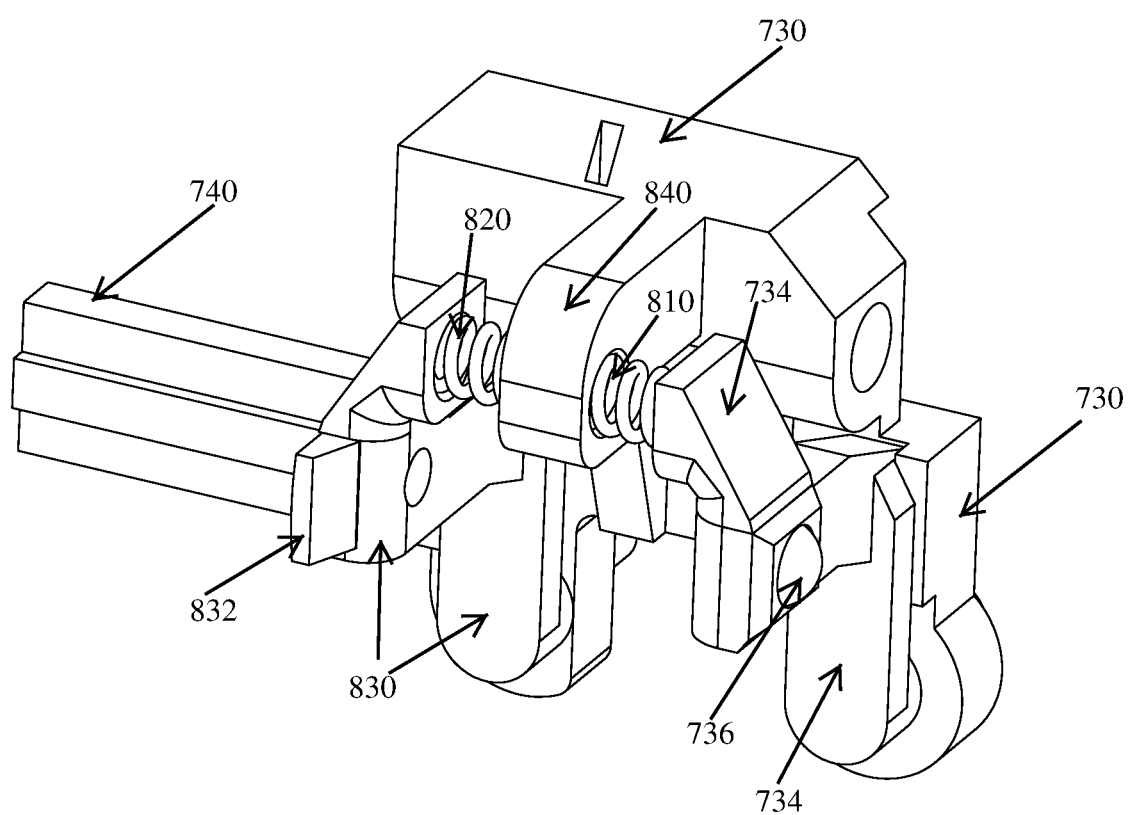
FIG. 8 illustrates an actuator assembly for switching the operation mode of a multi-mode input device according to certain embodiments.

FIG. 8 illustrates various components of an actuator assembly for switching the operation mode of multi-mode input device 700 according to certain embodiments. As shown, actuator assembly may include carriage 730 that may be moved along guide 740 by a motor as described above with respect to FIG. 7. Two rotatable arms 734 and 830 may be coupled to carriage 730 through hinges (or pivot) as described above. Rotatable arm 734 may include contact ball 736 partially embedded in rotatable arm 734. A first spring 810 may be positioned between a nose 840 of carriage 730 and rotatable arm 734 to keep rotatable arm 734 in position. When carriage 730 is moved away from the motor to cause contact between contact ball 736 and the ratchet mode zone, first spring 810 may press rotatable arm 734 (and thus contact ball 736) against the ratchet mode zone of the sidewall of the cavity on scroll wheel 710 to cause the different friction levels for the ratchet mode. The magnitude of the friction may depend on the strength of first spring 810 and the position of carriage 730.

FIG. 8 also shows a second rotatable arm 830 rotatably connected to carriage 730. A second spring 820 (or the same spring 810) may be positioned between nose 840 of carriage 730 and rotatable arm 830 to keep rotatable arm 830 in position. Rotatable arm 830 may include a head portion 832, where a friction pad (not shown in FIG. 8) may be attached. When carriage 730 is moved towards the motor to cause contact between the friction pad and the friction mode zone, second spring 820 may press rotatable arm 830 (and thus the friction pad) against the friction mode zone of the sidewall of the cavity on scroll wheel 710 to cause the substantially constant friction. The magnitude of the friction may depend on the strength of second spring 820 and the position of carriage 730.

Figure 9:
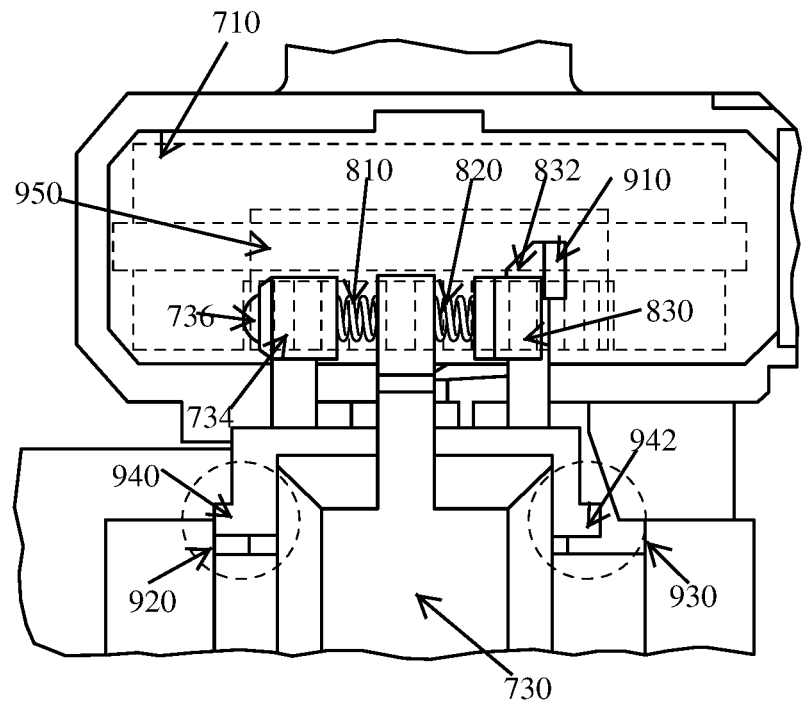
FIG. 9 illustrates an example of a multi-mode input device operating in a ratchet mode according to certain embodiments.

FIG. 9 illustrates multi-mode input device 700 operating in a ratchet mode according to certain embodiments. In FIG. 9, carriage 730 may be moved to a left-most position, where a left end 940 or carriage 730 may be in contact with and stopped by a left stop 920 on the body of multi-mode input device 700. When carriage 730 is at the left-most position, contact ball 736 on rotatable arm 734 may be compressed by first spring 810 against the ratchet mode zone on the side wall of a cavity 950 on scroll wheel 710. Thus, when scroll wheel 710 is rotated around its axis, contact ball 736 may be in contact with different regions of the ratchet mode zone to provide the desired friction profile for the ratchet mode.

Figure 10:
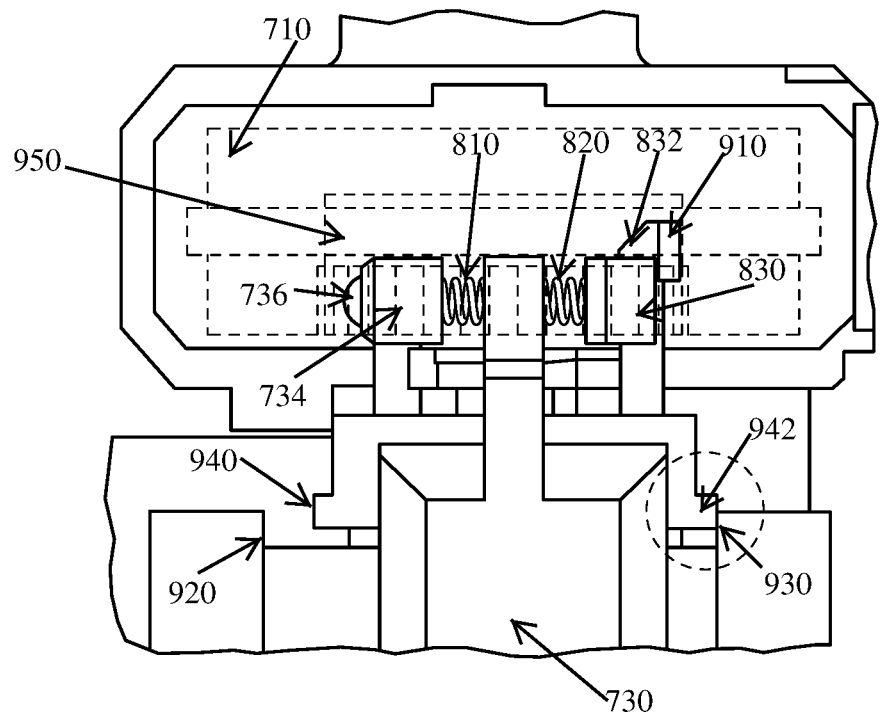
FIG. 10 illustrates an example of a multi-mode input device operating in a friction mode according to certain embodiments.

FIG. 10 illustrates multi-mode input device 700 operating in a friction mode according to certain embodiments. In FIG. 10, carriage 730 may be moved to a right-most position, where a right end 942 of carriage 730 may be in contact with and stopped by a right stop 930 on the body of multi-mode input device 700. When carriage 730 is at the right-most position, friction pad 910 on head portion 832 of rotatable arm 830 may be compressed by second spring 820 against the friction mode zone on the side wall of cavity 950 on scroll wheel 710. Thus, when scroll wheel 710 is rotated around its axis, friction pad 910 may be in contact with the friction mode zone to provide the substantially constant friction for the friction mode operation. The magnitude of the friction force may depend on the strength of second spring 820 and the location of carriage 730.

In the embodiments described above, a linear translation of a carriage assembly may be used to implement the multiple modes of operation and to select the desired operation mode. The different zones of the scroll wheel corresponding to the different operation modes may be arranged along the axial direction of the scroll wheel. In some other embodiments, the different zones of the scroll wheel corresponding to the different operation modes may be on one side of the scroll wheel and may be arranged along the radial direction of the scroll wheel. Because the radius of the scroll wheel may generally be larger than the depth of the cavity on one side of the scroll wheel, more operation modes may be implemented using the zones arranged in the radial direction of the scroll wheel.

FIG. 11 is a perspective view of an example multi-mode input device 1100 using a linear actuator for mode switching according to certain embodiments. Multi-mode input device 1100 may include a scroll wheel 1110 and a support 1120 that supports scroll wheel 1110 at the axis of scroll wheel 1110. Scroll wheel 1110 may include multiple ring-shaped zones (annuli with different diameters) arranged in the radial direction of scroll wheel 1110, such as one or more ratchet mode zones 1112, one or more friction mode zones 1114, and a freewheeling zone 1116. Multi-mode input device 1100 may also include an actuator assembly including one or more sliding blocks 1130. A sliding block 1130 can be moved along a guide 1140 by a motor to different axial locations of scroll wheel 1110 to align with the different zones on scroll wheel 1110. For example, a sliding block 1130 may be moved to locations A, B, and C, which may align with a ratchet mode zone 1112, a friction mode zone 1114, and a freewheeling zone 1116, respectively. An insert 1132 may be coupled to each sliding block 1130 through an adaptor 1134. Insert 1132 may include a contact head (e.g., including a contact ball) that may be in contact with different zones of the multiple zones when sliding block 1130 is moved along guide 1140.

FIG. 12 is a cross-sectional view of multi-mode input device 1100 according to certain embodiments. FIG. 12 shows that insert 1132 may include a contact ball 1210 that is partially embedded in a cavity in insert 1132. When sliding block 1130 is moved to a location along guide 1140 and aligned with one of the ring-shaped zones, contact ball 1210 may be in contact (or have no contact in the freewheel mode) with the zone to provide the desired friction profile for an operation mode.

Figure 13:
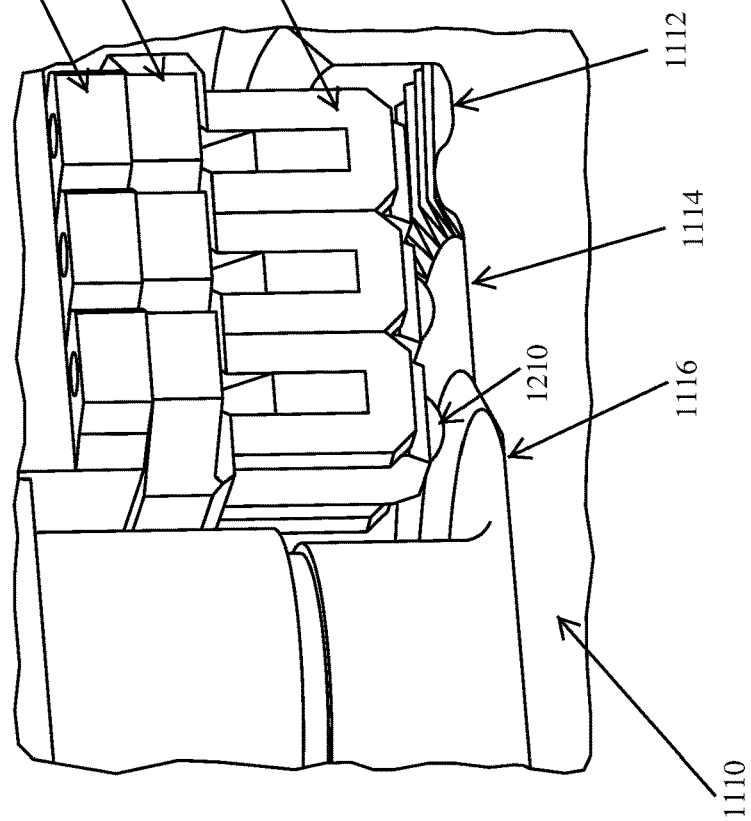
FIG. 13 is a zoom-in view of an example multi-mode input device including a linear actuator for mode switching according to certain embodiments.

FIG. 13 is a zoom-in cross-sectional view of multi-mode input device 1100 according to certain embodiments. As shown in FIG. 13, the surfaces of ratchet mode zone 1112, friction mode zone 1114, and freewheeling zone 1116 may have different depths or heights in the axial direction. For example, the surface of freewheeling zone 1116 may have the highest depth or lowest height, and thus contact ball 1210 may not contact the surface of freewheel zone 1116 when sliding block 1130 is aligned with freewheeling zone 1116. The surface of ratchet mode zone 1112 may include a predetermined pattern or height profile, such as teeth having different heights and/or widths at different regions. Thus, when scroll wheel 1110 is rotated, contact ball 1210 may interact with the teeth at different locations to cause the different friction levels. The surface of friction mode zone 1114 may be higher than the surface of freewheeling zone 1116, and may be either higher or lower than the average height of the surface of ratchet mode zone 1112, depending on the desired level of friction in the friction mode.

Figure 14:
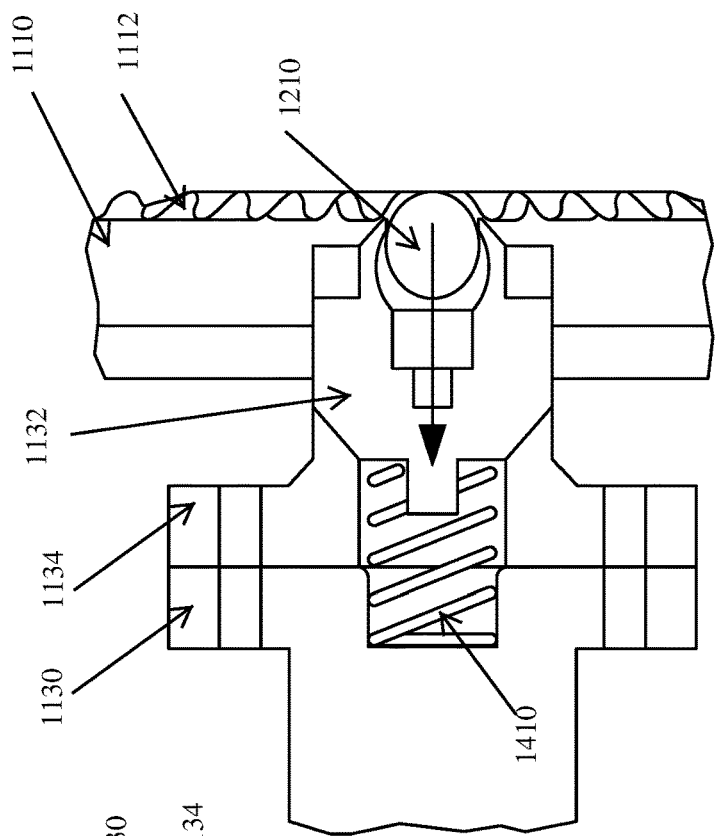
FIG. 14 is a zoom-in view of a cross-section of an example multi-mode input device including a linear actuator for mode switching according to certain embodiments.

FIG. 14 is a zoom-in cross-sectional view of a part of multi-mode input device 1100 according to certain embodiments. FIG. 14 shows that insert 1132 is coupled to sliding block 1130 through adaptor 1134. Adaptor 1134 may include an aperture that aligns with a cavity on sliding block 1130. A spring 1410 may be positioned in the cavity, pass through the aperture in adaptor 1134, and contact insert 1132 (or contact ball 1210) to apply forces on insert 1132 (or contact ball 1210) such that contact ball 1210 may contact the surface of ratchet mode zone 1112. Spring 1410 may also allow the location of contact ball 1210 in the axial direction of the scroll wheel to be changed in response to the change in height of the surface of ratchet mode zone 1112 when scroll wheel 1110 is rotated.

In some embodiments, a barrel cam may be used to implement the multiple modes and the switch among different operation modes of the scroll wheel in a multi-mode input device. A barrel cam or cylindrical cam may include a cylinder or a hollow cylinder that includes at least one continuous cutout region, where a follower may ride in the cutout region and move when the cylinder is rotated by a motor.

Figure 15:
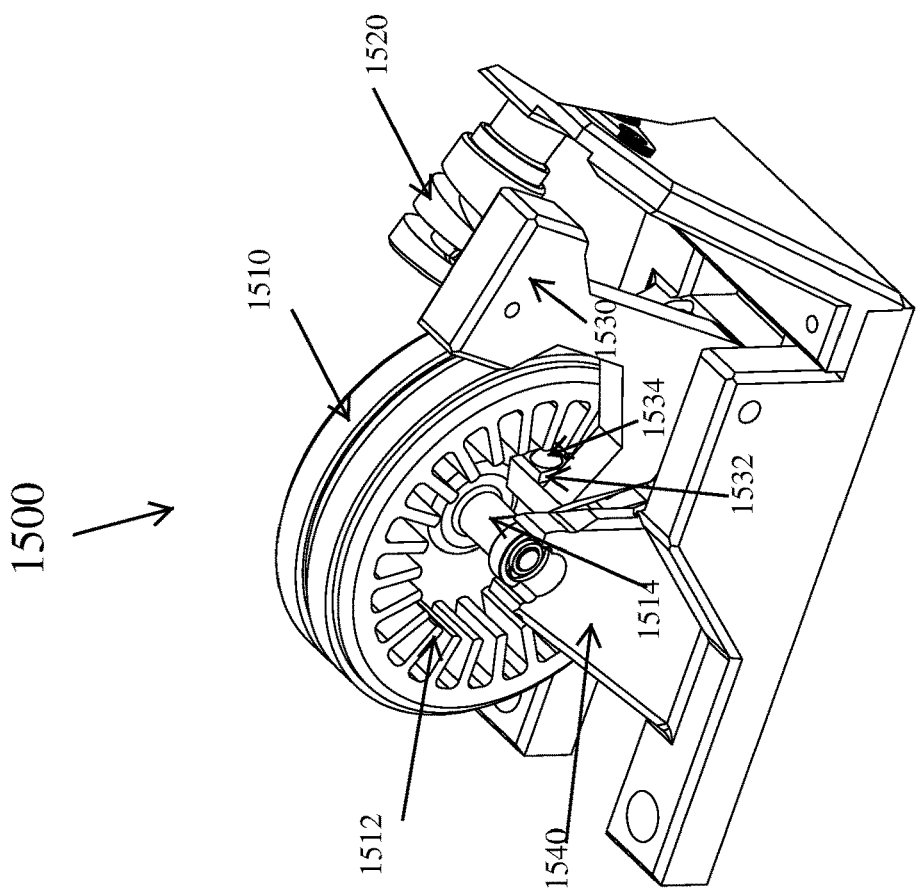
FIG. 15 illustrates an example multi-mode input device including a barrel cam actuator for mode switching according to certain embodiments.

FIG. 15 illustrates an example of a multi-mode input device 1500 including a barrel cam actuator for mode switching according to certain embodiments. Multi-mode input device 1500 may include a scroll wheel 1510, an actuator assembly that may include a barrel cam 1520 and an actuator arm 1530, and a support structure 1540 for supporting scroll wheel 1510 at axis 1514 of scroll wheel 1510. As in multi-mode input device 700, scroll wheel 1510 may include a cavity on at least one side. The side wall of the cavity may include a plurality of zones in the axial direction, where each of the plurality of zones may correspond to one operation mode. For example, an outermost zone 1512 may be a ratchet mode zone for providing frictions for the ratchet mode. Actuator arm 1530 may include a contact head 1532 that may include a contact ball 1534. When barrel cam 1520 is rotated by a motor (not shown in FIG. 15), a barrel cam follower connected to actuator arm 1530 may cause actuator arm 1530 to move along the axial direction and/or radial direction of scroll wheel 1510, which may in turn cause contact ball 1534 to be in contact with different zones on the side wall of the cavity (in a ratchet mode or friction mode) or to have no contact with the side wall of the cavity (in the freewheel mode). Using a barrel cam to select the operation mode may reduce the acceleration of actuator arm 1530, and reduce sound noises or vibrations. The cutout region on the barrel cam may have a desired profile to achieve the desired translation profile of actuator arm 1530 and lock the follower (and thus the actuator arm) into certain position. For example, the cutout region may include one or more indentations that may lock the follower in certain positions.

Figure 16:
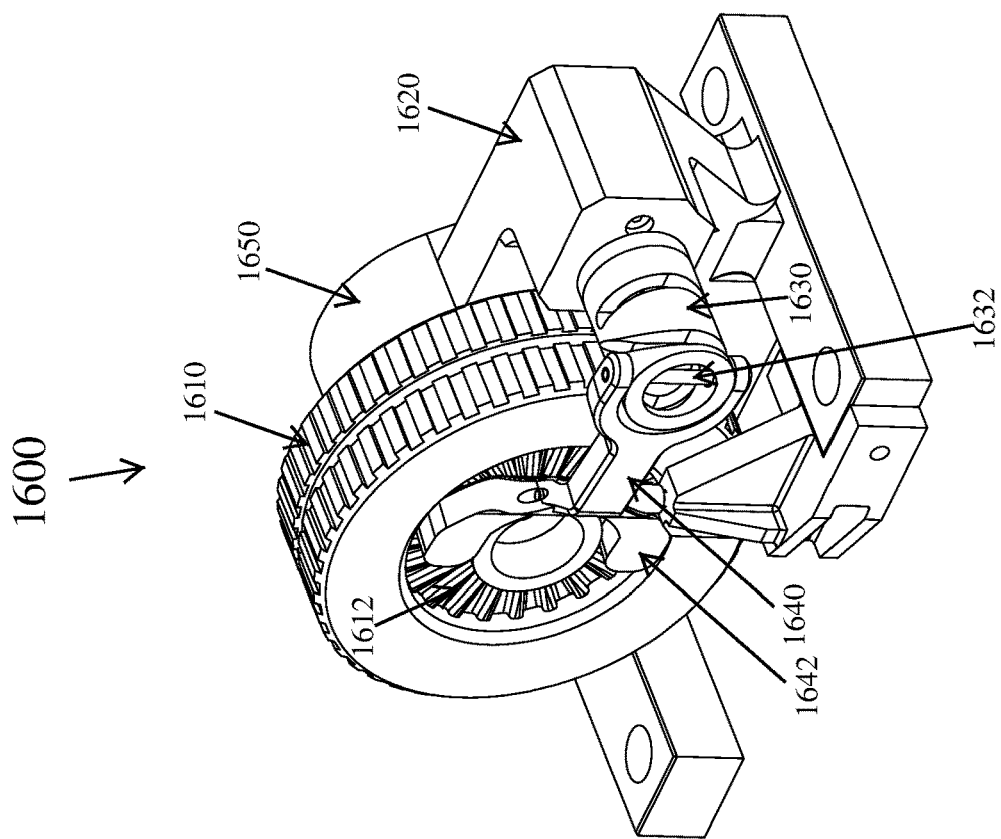
FIG. 16 illustrates another example multi-mode input device including a barrel cam actuator for mode switching according to certain embodiments.

FIG. 16 illustrates another example of a multi-mode input device 1600 including a barrel cam actuator for mode switching according to certain embodiments. Multi-mode input device 1600 may include a scroll wheel 1610, a support structure 1650 for supporting scroll wheel 1610, and an actuator assembly that may include a motor 1620, a barrel cam 1630, an actuator arm 1640. As in multi-mode input device 1100, scroll wheel 1610 may include multiple ring-shaped zones arranged along the radial direction of scroll wheel 1610, such as one or more ratchet mode zones 1612, one or more friction mode zones, and/or a freewheel mode zone. Motor 1620 may cause barrel cam 1630 to rotate, which may in turn cause a follower 1632 to move in the axial direction and/or radical direction of barrel cam 1630. The movement of follower 1632 may cause actuator arm 1640 that is connected to follower 1632 to move in the axial and/or radial direction of barrel cam 1630 (and thus in the axial and/or radial direction of scroll wheel 1610). As such, a contact head 1642 on actuator arm 1640 may be moved away from scroll wheel 1610 to put scroll wheel 1610 in the freewheel mode, or may be moved towards scroll wheel 1610 to be in contact with the surface of a zone on scroll wheel 1610 to set scroll wheel 1610 to a corresponding ratchet mode or friction mode. As described above with respect to barrel cam 1520, the cutout region of barrel cam 1630 may have a shape designed to cause the desired translation profile of the actuator arm and lock the follower (and thus the actuator arm) into certain positions.

In some embodiments described above, the friction profile may be achieved through the friction between two solid objects or surfaces (referred to as "dry friction), such as between an even or uneven surface and a contact ball or a friction pad. The friction between two solid objects may cause at least one of the two solid objects to wear out after a time period. In some embodiments, as described above, the desired magnitude of friction may be achieved through the use of, for example, a damping grease between two solid objects, thus minimizing the wearing of the solid objects.

Figure 17:
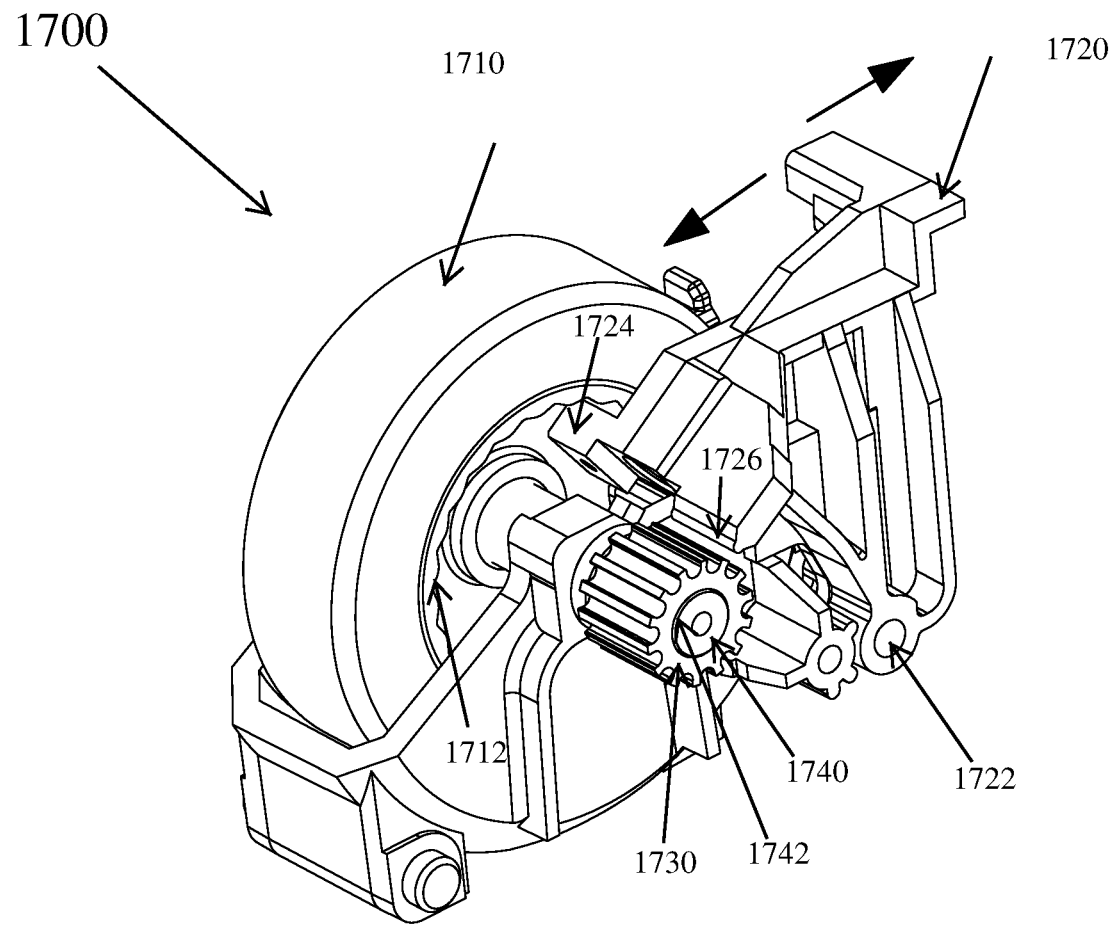
FIG. 17 illustrates an example of a multi-mode input device using wet friction according to certain embodiments.

FIG. 17 illustrates an example of a multi-mode input device 1700 according to certain embodiments. Multi-mode input device 1700 may include a scroll wheel 1710, an actuator arm 1720, and a friction gear 1730. Scroll wheel 1710 may include a cavity on at least one side. The side wall 1712 of the cavity may include teeth of different heights and/or widths that are designed based on the desired friction profile in the ratchet mode. Actuator arm 1720 may be rotated around a pivot 1722, for example, manually or by a rotational motor (e.g., a DC motor, a servo motor, a stepper motor, or the like) or an electromechanical actuator (e.g., a solenoid or a VCM). In some embodiments where actuator arm 1720 may be manually rotated, a locking mechanism may be used to lock actuator arm 1720 into one of multiple positions. Actuator arm 1720 may include a contact head 1724 that extends into the cavity of scroll wheel 1710. Contact head 1724 may include a contact ball. When actuator arm 1720 is rotated to the right-most position, the contact ball may be in contact with side wall 1712 and thus scroll wheel 1710 may be switched to the ratchet mode. Rotating scroll wheel 1710 may cause the contact ball to be in contact with different regions of side wall 1712 of the cavity that may have teeth with different heights and/or widths, thus providing different frictions for the ratchet mode.

Friction gear 1730 may include an aperture in the center and may couple with an axis 1740 for scroll wheel 1710 through the aperture. Axis 1740 may have a diameter slightly smaller than the diameter of the aperture. A layer of viscous material, such as damping grease, may be applied at the interface between the outer surface of axis 1740 and the inner surface of the aperture in friction gear 1730. The viscous material may cause friction gear 1730 to rotate with axis 1740 when the rotation of friction gear 1730 is not restricted. Thus, when actuator arm 1720 is rotated to the middle position such that the contact ball on contact head 1724 is moved away from (and thus having no contact with) side wall 1712, scroll wheel 1710 may operate in the freewheel mode if the rotation of friction gear 1730 is also not restricted.

Actuator arm 1720 may also include a locking tooth 1726 as shown in FIG. 17. When actuator arm 1720 is rotated to the left-most position, locking tooth 1726 may engage with friction gear 1730 to lock friction gear 1730. Thus, when scroll wheel 1710 is rotated, there may be a relative movement (e.g., rotation) between the outer surface of axis 1740 and the inner surface of friction gear 1730 (which is locked to a fixed location), and the viscous material, such as damping grease, applied at the interface between the outer surface of axis 1740 and the inner surface of the aperture of friction gear 1730 may cause a substantially constant friction force on axis 1740 (and thus scroll wheel 1710) (which may be referred to as "wet friction"). Therefore, scroll wheel 1710 may be switched to the friction mode when actuator arm 1720 is rotated to the left-most position.

Figure 18:
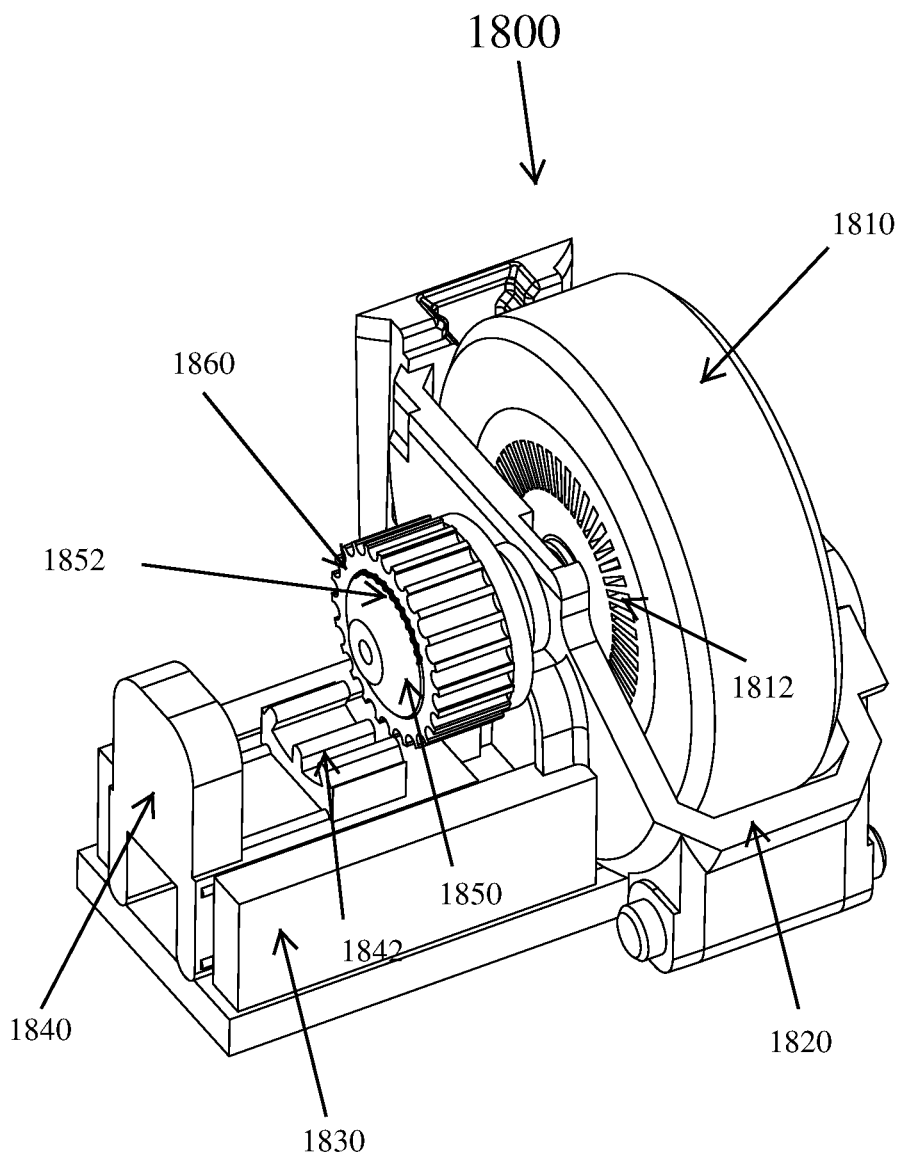
FIG. 18 illustrates another example of a multi-mode input device using wet friction according to certain embodiments.

FIG. 18 illustrates another example of a multi-mode input device 1800 according to certain embodiments. As multi-mode input device 1700, multi-mode input device 1800 may also use "wet friction" in the friction mode. Multi-mode input device 1800 may include a scroll wheel 1810 and an enclosure 1820 that encloses and supports scroll wheel 1810. As illustrated, scroll wheel 1810 may include a ratchet mode zone 1812 on a side surface of scroll wheel 1810. An axis 1850 for scroll wheel 1810 may be coupled with a friction gear 1860 through an aperture on friction gear 1860. Axis 1850 may have a diameter slightly smaller than the diameter of the aperture. A layer of viscous material 1852, such as damping grease, may be applied at the interface between the outer surface of axis 1850 and inner surface of the aperture of friction gear 1860. The viscous material may cause friction gear 1860 to rotate with axis 1850 when the rotation of friction gear 1860 is not restricted. Multi-mode input device 1800 may also include a guide 1830 and a sliding block 1840 that may be slid along guide 1830 manually or by an actuator, such as a rotational motor (e.g., a DC motor, a servo motor, a stepper motor, or the like) or an electromechanical actuator (e.g., a solenoid or a VCM). Sliding block 1840 may include a lock 1842 that may include one or more teeth matching with teeth on friction gear 1860.

To set scroll wheel 1810 to a freewheel mode, sliding block 1840 may be moved away from scroll wheel 1810 such that lock 1842 may not engage with friction gear 1860 and restrict the rotation of friction gear 1860. At the same time, a contact arm may be moved away and separated from ratchet mode zone 1812. Thus, scroll wheel 1810 may rotate freely with little or no friction.

To set scroll wheel 1810 to a ratchet mode, the contact arm may be moved towards scroll wheel 1810 to contact ratchet mode zone 1812 using mechanisms as described above. For example, in some embodiments, the contact arm may include a contact ball and a spring that may apply a force on the contact ball as described above, for example, with respect to FIG. 14. The spring may extend or may be compressed by the contact ball. When scroll wheel 1810 is rotated, the contact ball may move with respect to the contact arm as a result of the force applied to the contact ball by the spring and the compress force applied to the contact ball by the ratchet mode zone. The compress force between the contact ball and the ratchet mode zone, and thus the friction force applied to scroll wheel 1810, may depend on the surface shape of the ratchet mode zone that may be designed to achieve a desired friction profile.

To set scroll wheel 1810 to a friction mode, sliding block 1840 may be moved towards scroll wheel 1810 such that lock 1842 may engage with friction gear 1860 and restrict the rotation of friction gear 1860. As such, when scroll wheel 1810 is rotated, there may be a relative movement (rotation) between axis 1850 and friction gear 1860 (which may be locked at a fixed location by lock 1842), and the viscous material (e.g., damping grease) applied at the interface between the outer surface of axis 1850 and the inner surface of the aperture of friction gear 1860 may cause a substantially constant friction force on axis 1850 (and thus scroll wheel 1810).

In some embodiments, other techniques may be used to implement the multiple operation modes by selectively applying different friction profiles on the scroll wheel. For example, as described in U.S. Provisional Patent Application No. 62/690,591 entitled "Electromagnetic Mode Change of Peripheral Interface Wheel," which is herein incorporated by reference for all purposes, magnetic force, rather than mechanical force, may be used to apply the friction profiles on the scroll wheel. In one embodiment, the scroll wheel may include a ferromagnetic component, and the actuator may include an electro permanent magnet (EPM). The EPM may be controlled to selectively apply different amounts of magnetic force between the actuator and the scroll wheel.

In some embodiments, the various structures and switching techniques described above may be combined in any reasonable manners to provide a scroll wheel with multiple operation modes. In addition, a scroll wheel may be configurable to work in more than one ratchet mode or more than one friction mode, so as to provide, for example, more than 50, more than 80, or more than 100 ratchets, or more than one constant friction level. In various embodiments, the switch among different operation modes may be performed using a motor, such as a DC motor, a servo motor, a stepper motor, a linear motor, a solenoid, or a VCM as described above.

In some embodiments, the scroll wheel may be automatically switched to an appropriate operation mode based on the application and/or the interactive content displayed to a user. At a high level of abstraction, software operating on a host computing device (e.g., executed by processor 302) may manage mapping functions (e.g., mapping reconfigurable parameters associated with interactive elements to operation parameters of user-manipulable element (e.g., scroll wheel) on an input device, as further discussed below) and interfacing between computer software running on the host computing device (e.g., Photoshop®) and the connected input device (e.g., scroll wheel). Alternatively or additionally, some management may be performed, in part, by aspects (e.g., processor 210) of the corresponding input device. From a user perspective, the user-manipulable element may be associated with the graphical element closest to a cursor on a display. For example, as a user moves a cursor toward a first graphical element (e.g., selectable control element), scroll wheel can be dynamically programmed to control an editable parameter (e.g., font type) associated with that graphical element. Similarly, as the user moves the cursor towards a second selectable control element, scroll wheel may be automatically and dynamically programmed to control an editable parameter (e.g., volume) associated with the second selectable control element. Alternatively or additionally, associating the user-manipulable object with the editable parameter of a selectable control element can be based on other criteria other than a location of a cursor. For example, a selectable control element may be selected to be associated with a user-manipulable object based on historical usage. Thus, a "most used" selectable control element may be selected irrespective of the location of the cursor. Other methods of selection are possible, as would be understood by one of ordinary skill in the art. For example, as described above, the mode selection may be determined or triggered based on software events, the current state of the input device (e.g., reaching the bottom of a page), or the displayed content (e.g., density of the text or sizes of certain objects). The following embodiments describe just some of the many embodiments that fall within the purview of this disclosure.

Figure 19:
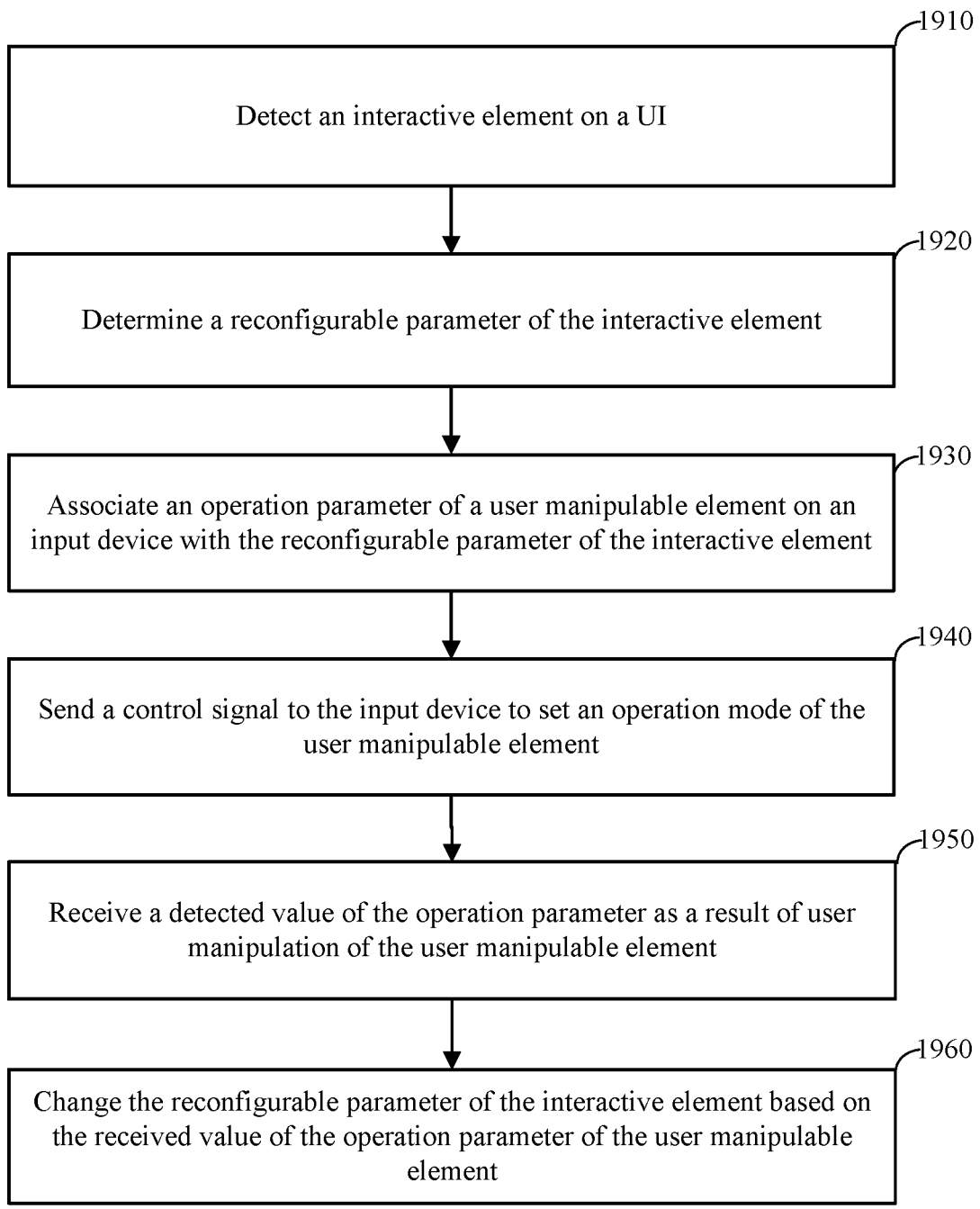
FIG. 19 is a simplified flow chart illustrating an example of a content adaptive method for operating a multi-mode input device according to certain embodiments.

FIG. 19 is a simplified flow chart 1900 illustrating an example of a content adaptive method for operating a multi-mode input device according to certain embodiments. Operations in flow chart 1900 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, operations in flow chart 1900 can be performed by processor(s) 210 of system 200 or processor(s) 302 of system 300, as shown and described above with respect to FIGS. 2 and 3.

At block 1910, one or more processors, such as processor(s) 210 of system 200 or processor(s) 302 of system 300, may detect an interactive element on a user interface. A user interface can be a graphical window, virtual desktop, applications, or any image on a display (e.g., display 120) that a user can interact with. A user interface can also be an audio input and/or output device, such as a microphone or a speaker. In some embodiments, the user interface may include a haptic user interface that may detect or generate motions, vibrations, or touch feelings. An interactive element can include any user interface element that can be controlled by a user. For example, some interactive elements can include desktop or window-based selectable icons, scroll bars, task bar elements, tabs, text, media players, media player controls (e.g., volume, pan, bass/treble, media transport controls, etc.), hyperlinks, or the like. One of ordinary skill in the art would understand the many possible types of interactive elements that could be selectable on a user interface. In some embodiments, certain interactive elements may not be "selectable" from a current view but may be nested in various dropdown menus or interfaces. For example, a media player may include different skins (e.g., background images) with a selectable list of skins (i.e., the interactive element) buried in a nested menu. In such instances, the interactive element is not immediately selectable in a current view (outside of the corresponding menu bar), but can be detected nonetheless by a host computing device, such as computer 110. In certain embodiments, software configuring an input device may access particular software operating on the host computing device to determine what elements are included in a particular window. For instance, presentation software can be accessed to determine what is included in each particular slide (e.g., embedded hyperlinks, spreadsheets, images, etc.), which may be readily available and easily accessible as would be understood by one of ordinary skill in the art. Similarly, photo editing software (e.g., Photoshop®) can be accessed to determine what selectable control elements (e.g., icons, menus, etc.) are available. It should be understood that the various methods of identifying elements described with respect to FIG. 19 can be applied to any of the figures, embodiments, systems, or methods, etc., described herein, as would be understood by one of ordinary skill in the art.

At block 1920, the one or more processors may determine a reconfigurable parameter of the interactive element. A reconfigurable parameter can be any adjustable value, setting, mode of operation, or the like, associated with the interactive element. For example, an interactive element can be alphanumeric text and the reconfigurable parameter can include a font size, font type, font color, text position (e.g., text can be moved on the display in x and y directions), or the like. In another example, a media player can be the interactive element and the reconfigurable parameter can include a volume, pan, bass/treble settings, media transport controls, and the like. In yet another example, a photo or image frame may be the interactive element and the reconfigurable parameters can include a zoom (magnification), pan control, brightness, contrast, filter selection, etc. One of ordinary skill in the art would understand the many variations, modifications, and alternative embodiments of possible interactive elements and reconfigurable parameters.

At block 1930, the one or more processors may associate an operation parameter of a user-manipulable element on an input device with the reconfigurable parameter of the interactive element. The user-manipulable element can include, for example, a knob, button, scroll wheel, trackball, joystick, slider, or the like, as would be understood by one of ordinary skill in the art. The input device may include, for example, a mouse, a keyboard, a game control, or a virtual reality controller. The operation parameter may include, for example, rotation resistance (or friction), rotation speed, or rotation sensitivity of a scroll wheel. One example of associating an operation parameter of a user-manipulable element with the reconfigurable parameter of the interactive element can include associating a font-size selection for alphanumeric text, a color of an image, a brightness of an image, or a scale of displaying an image on a display with a friction level or friction profile of a scroll wheel on a computer mouse. The examples provided herein may generally describe associating a reconfigurable parameter of the interactive element with an operation parameter of a single user-manipulable element. In some cases, the same reconfigurable parameter for an interactive element can be associated with different user-manipulable elements based on certain contexts. For instance, a volume control on a media player may be associated with the friction force of a scroll wheel during typical use, but may opt to be associated with a slider or touch sensor when the scroll wheel is being used for other purposes.

At block 1940, the one or more processors may send a control signal to the input device to set an operation mode of the user-manipulable element. The control signal may be used to, for example, setting a scroll wheel of a computer mouse to one of one or more ratchet modes, one or more friction mode, and a freewheel mode as described above. The control signal can be in any suitable format that can control, for example, the scroll wheel of a computer mouse, as would be understood by one of ordinary skill in the art. The one or more processors may generate the control signal based on properties of the reconfigurable parameter, such as the desired sensitivity, accuracy, or resolution. One of ordinary skill in the art would understand the many variations, modifications, and alternative embodiments thereof. In some embodiments, operations at blocks 1930 and 1940 may be performed in a single step to generate and send a control signal to both associate the reconfigurable parameter with a user-manipulable element and set an operation mode of the user-manipulable element.

At block 1950, the one or more processors may receive a detected value of the operation parameter of the user-manipulable element as a result of user manipulation of the user-manipulable element. For example, when the scroll wheel of a computer mouse is set to a ratchet mode, the friction level of the scroll wheel during the operation of the scroll wheel by a user that rotates the scroll wheel may be detected and sent to the one or more processors. As another example, when the scroll wheel is set to the freewheel mode or friction mode, data indicating user manipulation or rotating speed of the scroll wheel may be sent to the one or more processors.

At block 1960, the one or more processors may then change the reconfigurable parameter of the interactive element based on the received value of the operation parameter of the user-manipulable element. For example, the font-size, the display size, color, brightness, view angle of an image, the volume of a speaker, etc., may be reconfigured or modified based on the received value of the operation parameter (e.g., friction) when the user manipulates the user-manipulable element (e.g., scrolling the scroll wheel). In this way, the user may configure the reconfigurable parameters of the interactive element by manipulating the input device.

It should be appreciated that the specific operations described with respect to FIG. 19 provide a particular method for assigning a function to a user-manipulable element on an input device, according to certain embodiments. Other sequences of operations may also be performed according to alternative embodiments. For example, alternative embodiments may perform the operations outlined above in a different order. Moreover, the individual block illustrated in FIG. 19 may include multiple sub-blocks that may be performed in various sequences as appropriate. Furthermore, additional operations may be added or removed depending on the particular applications.

Figure 20:
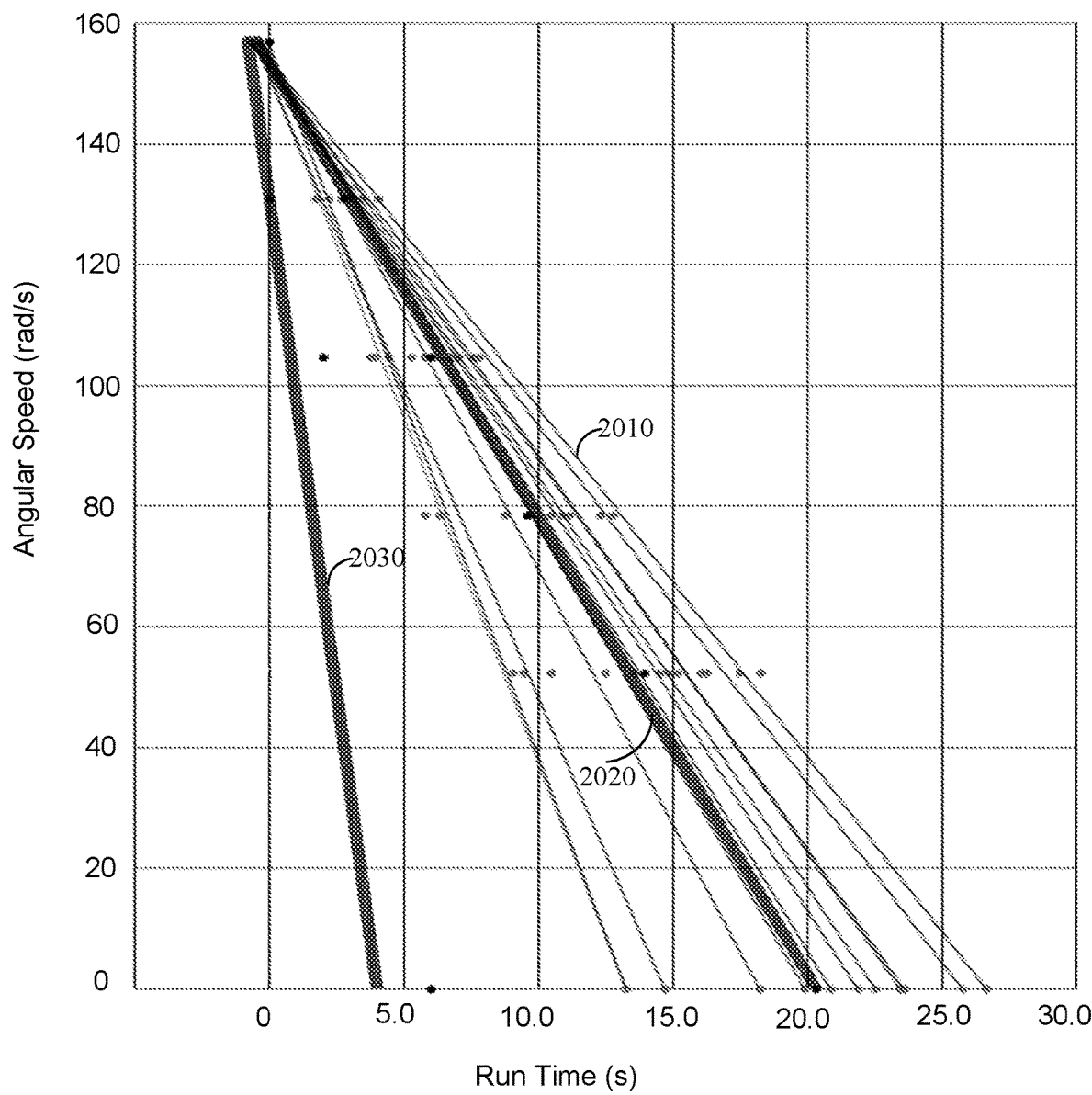
FIG. 20 is a graph illustrating test results for twelve samples of scroll wheels operating in the freewheel mode according to certain embodiments.
Figure 21:
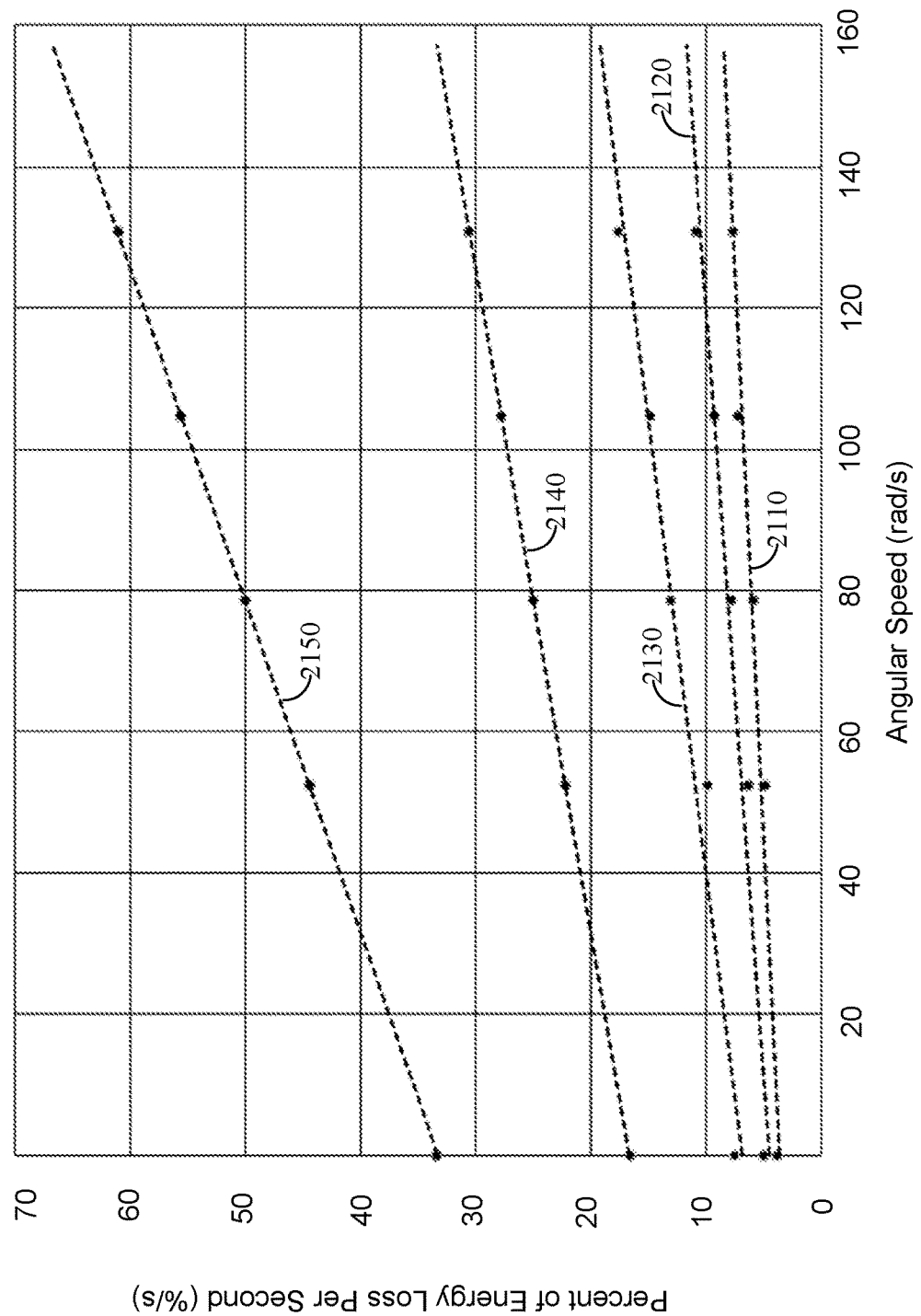
FIG. 21 is a graph illustrating the percentage of rotational energy loss per second as a function of the rotational speed for some samples of scroll wheels operating in the freewheel mode according to certain embodiments.

FIG. 20 is a graph 2000 illustrating test results for twelve samples of scroll wheels operating in the freewheel mode according to certain embodiments. The test results show the angular speed over time for each sample after the externally exerted force is removed. The x-axis of graph 2000 corresponds to the run time after the externally exerted force is removed. The y-axis of graph 2000 corresponds to the angular speed (in rad/s) at measurement time points. Each dot corresponds to a data point. Each thin line 2010 shows the trend of angular speed loss over time for each respective sample. A line 2020 shows the trend of average angular speed loss over time for the twelve samples. A line 2030 shows an example specification for the freewheel mode.

In the tests shown by FIG. 20, the initial angular speed after the externally exerted force is removed is about 1500 rpm or about 157 rad/s. Based on the test results, the angular deceleration of the twelve samples of scroll wheels in the freewheel mode may be determined. The minimum angular deceleration is about 56 rpm/s (or about 5.9 rad/s$^2$), the maximum angular deceleration is about 115 rpm/s (or about 11.8 rad/s$^2$), and the average angular deceleration is about 75 rpm/s (or about 7.7 rad/s$^2$). The deceleration specification of the samples of scroll wheels in the freewheel mode may be set to, for example, about 250 rpm/s (or about 26.2 rad/s$^2$) or about 500 rpm/s (or about 52 rad/s$^2$).

In addition, the braking torques of the twelve samples of scroll wheels in the freewheel mode are determined. The minimum braking torque is about 0.007 mNm, the maximum braking torque is about 0.014 mNm, and the average braking torque is about 0.009 mNm. The braking torque specification of the samples of scroll wheels in the freewheel mode may be set to, for example, about 0.03 mNm or about 0.05 mNm.

The rotational energy loss characteristics of the twelve samples of scroll wheels in the freewheel mode are also measured. Table 1 shows the rotational energy of the samples at different angular speeds, the times it takes to reach the different angular speeds from an initial angular speed (e.g., 157.1 rad/s), and the rate of rotational energy loss in J/s. Table 2 shows the rates of rotational energy loss in %/s. The results in Table 2 indicate that the average rate of rotational energy loss is about 10% per second, where the rate of rotational energy loss specification may be set to, for example, about 30% per second or about 60% per second.

TABLE 1

| Rate of kinetic energy loss | | | | | | | |
|---|---|---|---|---|---|---|---|
| ωi | 157.1 | 130.9 | 104.7 | 78.5 | 52.4 | 0.0 | [rad/s] |
| Rotational energy | 1.45E−02 | 1.00E−02 | 6.43E−03 | 3.62E−03 | 1.61E−03 | 0.00E+00 | [J] |
| Δti SPEC | 0.0 | 1.0 | 2.0 | 3.0 | 4.0 | 6.0 | [s] |
| Δti Average | 0.0 | 2.8 | 6.0 | 9.6 | 13.9 | 20.3 | [s] |
| Δti Samples (min) | 0.0 | 4.0 | 7.8 | 12.8 | 18.2 | 26.6 | [s] |

TABLE 1-continued

Rate of kinetic energy loss

| | | | | | | | |
|---|---|---|---|---|---|---|---|
| Δti Samples (max) | 0.0 | 1.7 | 3.7 | 5.8 | 9.0 | 13.3 | [s] |
| $P_{loss}$_spec | | −4.42E−03 | −4.02E−03 | −3.62E−03 | −3.21E−03 | −2.41E−03 | [J/s] |
| $P_{loss}$_average | | −1.58E−03 | −1.34E−03 | −1.13E−03 | −9.22E−04 | −7.12E−04 | [J/s] |
| $P_{lossmin}$_samples | | −1.10E−03 | −1.03E−03 | −8.50E−04 | −7.05E−04 | −5.43E−04 | [J/s] |
| $P_{lossmax}$_samples | | −2.56E−03 | −2.15E−03 | −1.88E−03 | −1.42E−03 | −1.09E−03 | [J/s] |

TABLE 2

Percentage of rotational energy loss per second

| ω | 157.1 | 130.9 | 104.7 | 78.5 | 52.4 | 0.0 | average | maximum loss |
|---|---|---|---|---|---|---|---|---|
| % Ploss_spec | 0.00% | −30.56% | −27.78% | −25.00% | −22.22% | −16.67% | −24.44% | −30.56% |
| % Ploss_average | 0.00% | −10.91% | −9.30% | −7.83% | −6.37% | −4.92% | −7.87% | −10.91% |
| % Plossmin_samples | 0.00% | −7.58% | −7.14% | −5.87% | −4.87% | −3.75% | −5.84% | −7.58% |
| % Plossmax_samples | 0.00% | −17.68% | −14.84% | −13.02% | −9.85% | −7.54% | −12.59% | −17.68% |

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. An interface device, comprising:
    a displacement sensor configured to detect movement of the interface device relative to a work surface;
    a wheel member configurable to rotate around an axis in a plurality of operation modes, each operation mode associated with a respective unique friction profile, wherein the wheel member comprises a plurality of ring-shaped zones on a side surface of the wheel member, the plurality of ring-shaped zones arranged in a radial direction of the wheel member, wherein:
        a first zone of the plurality of ring-shaped zones comprises a plurality of teeth; and
        a second zone of the plurality of ring-shaped zones has an even surface; and
    an actuator assembly configured to set the wheel member to each of the plurality of operation modes, wherein the actuator assembly comprises:
        a sliding block configured to move in the radial direction of the wheel member; and
        a contact ball coupled to the sliding block through a spring, wherein the contact ball is configured to contact the first zone when the sliding block is at a first location aligned with the first zone, and wherein the contact ball is configured to contact the second zone when the sliding block is at a second location aligned with the second zone,
    wherein the plurality of operation modes includes a freewheel mode and at least two additional modes, the at least two additional modes including:
        two or more different ratchet modes;
        two or more different constant friction modes; or
        at least one constant friction mode and at least one ratchet mode.

2. The interface device of claim 1, wherein:
    a third zone of the plurality of ring-shaped zones has a surface lower than the even surface of the second zone; and
    the contact ball is configured to be separate from the third zone when the sliding block is at a third location aligned with the third zone.

* * * * *